(12) United States Patent
Detwiler

(10) Patent No.: US 6,502,753 B2
(45) Date of Patent: Jan. 7, 2003

(54) COMPACT DUAL APERTURE SCANNER

(75) Inventor: Paul O. Detwiler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/794,839

(22) Filed: Feb. 26, 2001

(65) Prior Publication Data

US 2002/0162887 A1 Nov. 7, 2002

(51) Int. Cl.$^7$ ................................................ G06K 7/10
(52) U.S. Cl. ........................ 235/462.4; 235/472.01; 235/462.25
(58) Field of Search ................................ 235/470, 454, 235/462.01–462.43, 472.01–472.03

(56) References Cited

U.S. PATENT DOCUMENTS

| | | | | |
|---|---|---|---|---|
| 4,933,539 A | * | 6/1990 | Stewart et al. | 235/470 |
| 5,206,491 A | | 4/1993 | Katoh et al. | 235/467 |
| 5,216,232 A | * | 6/1993 | Knowles et al. | 235/467 |
| 5,229,588 A | | 7/1993 | Detwiler et al. | 235/467 |
| 5,286,961 A | * | 2/1994 | Saegusa | 235/467 |
| 5,293,033 A | | 3/1994 | Yamashita | 235/462 |
| 5,308,963 A | * | 5/1994 | Baitz | 235/462 |
| 5,459,308 A | | 10/1995 | Detwiler et al. | 235/467 |
| 5,475,207 A | | 12/1995 | Bobba et al. | 235/467 |
| 5,684,289 A | | 11/1997 | Detwiler et al. | 235/467 |
| 5,705,802 A | | 1/1998 | Bobba et al. | 235/467 |
| 5,801,370 A | | 9/1998 | Katoh et al. | 235/467 |
| 5,834,708 A | | 11/1998 | Svetal et al. | 177/180 |
| 5,837,988 A | | 11/1998 | Bobba et al. | 235/467 |
| 5,886,336 A | | 3/1999 | Tang et al. | 235/462 |
| 5,936,218 A | | 8/1999 | Ohkawa et al. | 235/162.39 |
| 5,975,417 A | | 11/1999 | Spencer et al. | 235/462.36 |
| 6,059,189 A | | 5/2000 | Detwiler et al. | 235/467 |
| 6,076,735 A | | 6/2000 | Saegusa | 235/462.4 |

FOREIGN PATENT DOCUMENTS

GB        2284086 A    *    5/1995

* cited by examiner

Primary Examiner—Thien M. Le
(74) Attorney, Agent, or Firm—Priest & Goldstein, PLLC

(57) ABSTRACT

A compact dual aperture scanner is disclosed. The scanner includes a horizontal cabinet including a horizontal aperture and a vertical cabinet including a vertical aperture. The vertical cabinet contains a laser source and deflecting mirror in a lower portion of the vertical cabinet and a polygonal spinner in an upper portion of the vertical cabinet. The laser source directs a laser beam at the deflecting mirror, which deflects the laser beam to the spinner. The spinner rotates, deflecting the laser beam into a plurality of rays. The rays strike a series of primary and secondary mirrors within the vertical and horizontal cabinets, which deflect the rays to produce a scan pattern at each of the horizontal and vertical apertures. When scattered light, such as may be reflected from a bar code, enters the vertical or horizontal aperture, the light is deflected by the secondary and primary mirrors to the spinner, where it is deflected to a collection lens and directed to the deflecting mirror. The deflecting mirror deflects the light onto a photodetector, which produces a photosignal which can be processed to extract bar code information. The location of the spinner inside the vertical cabinet allows the horizontal cabinet to be designed more shallow and compact than would be necessary if the spinner were located within the horizontal cabinet, allowing greater versatility in positioning and use of the scanner.

28 Claims, 16 Drawing Sheets

COMPACT DUAL APERTURE SCANNER

FIELD OF THE INVENTION

The present invention relates generally to improved bar code scanning and processing. More particularly, the invention relates to improved configurations and methods for compact dual aperture bar code scanning.

BACKGROUND OF THE INVENTION

Bar code scanners are used in a wide variety of applications, notably retail checkout applications. Bar code scanners used in retail checkout applications appear in a wide variety of different configurations. A popular and useful configuration is a dual aperture scanner, which emits a scan pattern through each of two apertures, typically a generally horizontally oriented aperture and a generally vertically oriented aperture. A product is scanned by moving it so that it passes over the horizontal aperture and in front of the vertical aperture. In this way, a scan pattern emerging from the horizontal aperture illuminates one or more sides of the product and a scan pattern emerging from the vertical aperture illuminates one or more additional sides of the product. Thus, multiple sides of a product are illuminated, increasing the likelihood that a scan pattern emerging from one of the apertures will illuminate a bar code on the product and decreasing the likelihood that a product will need to be oriented in order to position a bar code to be scanned. Dual aperture scanners are typically capable of higher throughput than are single aperture scanners because single aperture scanners require more frequent orientation of items in order to bring barcodes on the items within the single scan pattern emitted by a single aperture scanner. Details of dual aperture scanners are disclosed in U.S. Pat. Nos. 6,059,189; 5,459,308 and 5,229,588, assigned to the assignee of the present invention and incorporated herein by reference in their entirety.

Scanned items are typically passed directly across the horizontal aperture, coming into physical contact with the horizontal aperture. Because items come into physical contact with the aperture, the material covering the aperture is subjected to considerable stress and therefore is typically made of an extremely durable material such as sapphire or diamond. Such materials are expensive, and therefore the horizontal aperture is typically relatively small. Scanned items are not typically brought into physical contact with the vertical aperture, and therefore the material covering the vertical aperture does not need to be as durable as that covering the horizontal aperture. The material covering the vertical aperture may suitably be made of an inexpensive material such as plastic, and the vertical aperture is therefore typically larger than the horizontal aperture.

A compact dual aperture scanner design would combine high throughput with the ability to be used in retail and other environments in which space is at a premium. However, many prior art scanner designs are not well adapted to being made compact, because of the placement of components in the scanner and because of the need to provide light paths which will produce desired scan patterns at the vertical and horizontal apertures.

There exists, therefore, a need for a dual aperture scanner which arranges components inside a compact volume in order to effectively use available space and to provide light paths to produce desired scan patterns at the horizontal and vertical apertures.

SUMMARY OF THE INVENTION

A dual aperture scanner according to one aspect of the present invention includes a horizontal cabinet section, or optics base, and a vertical cabinet section, or tower. The optics base includes a top surface and has a horizontal aperture within the top surface. The tower includes a front surface and has a vertical aperture within the front surface. An operator may suitably sit facing the vertical aperture so that the operator can pass items from left to right or right to left over the horizontal aperture and in front of the vertical aperture. The tower contains an optics engine, comprising electronics for light generation and detection, a rectangular spinner, a spinner motor and a set of primary mirrors, all mounted on a single mounting block. The optics engine includes a laser which emits a laser beam in a horizontal direction. The laser beam strikes a deflecting mirror which is preferably oriented 45 degrees from the horizontal. The deflecting mirror deflects the laser beam upward so that the laser beam strikes the spinner. The spinner has four facets, aligned at different angles. As the spinner rotates, the laser beam strikes and is reflected by the first, second, third and fourth facets in order. The spinner scans the laser beam to produce fans of rays which are reflected from the spinner in directions determined by the orientation of the spinner and by the angles of the facets from which the rays are reflected. The facets of the spinner are oriented at different angles, so that they can reflect the laser beam so as to produce rays having different directions. The first and third facets both reflect the laser beam so as to produce rays oriented downward and toward the vertical aperture, that is, toward the front of the scanner, and the second and fourth facets both reflect the beam to as to produce rays oriented downward and away from the vertical aperture, or toward the rear of the scanner. The rays are directed toward primary pattern mirrors. The primary pattern mirrors further reflect the rays to secondary mirrors. The secondary mirrors reflect the rays through the horizontal and vertical apertures and out of the scanner to produce a scan pattern emerging from each aperture. The rays initially travel away from the spinner, but the mirrors are oriented such that some of the rays are reflected back in the direction of the spinner and follow paths which take them in close proximity to the spinner in order to follow a path leading from the spinner to the primary and secondary mirrors to which they are directed and from the secondary mirrors to the correct aperture. Orienting the mirrors so that rays are directed to travel in the proximity of the spinner effectively uses space near the spinner in order to provide desired path lengths for the rays and allows greater flexibility in designing scan patterns.

When a scan pattern strikes a bar code outside the scanner, a portion of the light making up the scan pattern is scattered and is reflected back into the scanner in an expanding cone centered on the incident laser beam. The scattered light passes through the apertures and strikes in turn the various secondary mirrors, primary mirrors and the spinner, where it is de-scanned. The de-scanned light strikes a collection lens, where it is focused and directed toward a photodetector. The deflecting mirror reflects the collected light onto the photodetector. The photodetector produces a photosignal which can be processed to extract the bar code information.

A more complete understanding of the present invention, as well as further features and advantages of the invention, will be apparent from the following Detailed Description and the accompanying drawings.

DETAILED DESCRIPTION

Figure 1A:
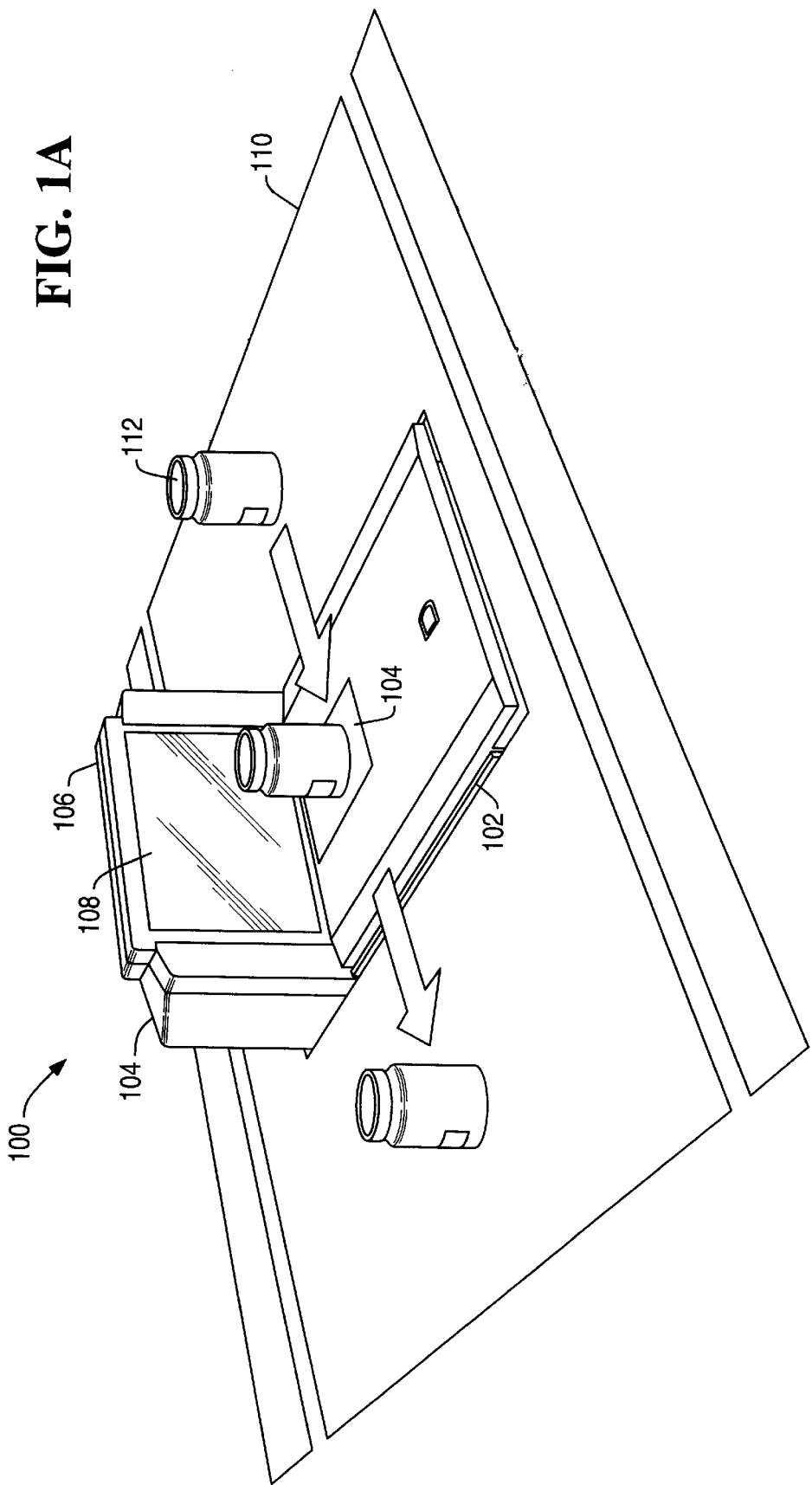
FIG. 1A is a perspective view of a compact dual aperture scanner according to the present invention.

FIG. 1A is a perspective view of a compact dual aperture scanner 100 according to the present invention. The scanner 100 includes a generally horizontal cabinet section, or optics base, 102 including a horizontal aperture 104. The scanner also includes a generally vertical cabinet section, or tower, 106 having a vertical aperture 108. The scanner 100 illustrated here has an overall length of 11.6 inches. Other dimensions will be described in connection with FIGS. 1B–1D below. The scanner 100 is typically installed in a checkout counter, of which a top surface 110 is shown here. The tower 106 extends 6.36 inches above the top surface 110 of the checkout counter. The scanner 100 is used to scan products by passing a product from right to left or from left to right over the horizontal aperture 104 and in front of the vertical aperture 108. A product 112 is shown here as passing across the horizontal apertures 102 and 104 for scanning. Passing the product 112 across the apertures allows scan patterns emerging from the apertures to strike the product 112 on multiple sides, increasing the likelihood that a scan pattern will strike a bar code on the product 112 and decreasing the likelihood that orientation of the product 112 will be needed in order to cause a scan pattern to strike the bar code.

The tower 106 houses a laser source and a photodetector. The tower 106 also houses a spinner, and the optics base 102 and the tower 106 also house mirrors and other elements needed for appropriate direction of light during bar code scanning and processing. The spinner and the mirrors and other elements direct the laser light to produce scan patterns emitted from the horizontal aperture 104 and the vertical aperture 108, and also direct scattered light reflected from a bar code to the photodetector to produce a photosignal which can be processed to extract bar code information. The various internal elements of the scanner 100 will be discussed below in connection with FIGS. 2–5.

Figure 1B:
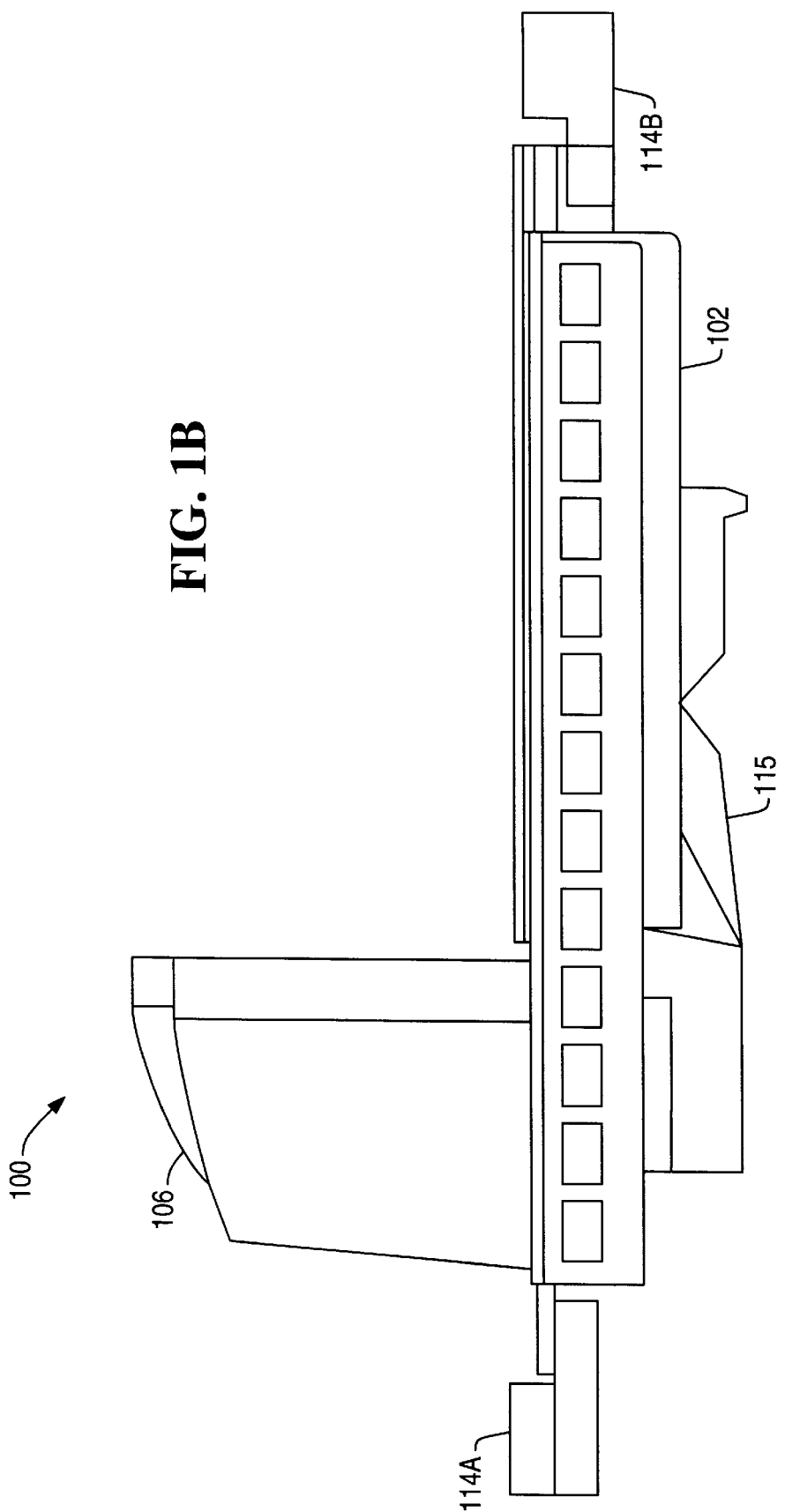
FIG. 1B is a side view of a compact dual aperture scanner according to the present invention.

FIG. 1B is a side view of the scanner 100. The scanner 100 is installed in a checkout counter. Supports 114A and 114B are shown as supporting the scanner 100 so that the optics base 102 is flush with the top surface 110 of the checkout counter. A mounting base 115 is also shown attached to the scanner 100, supporting the scanner 100 when the scanner 100 is installed in a checkout counter. The scanner 100 has an overall length of 20 inches. The tower 106 has a height of 9.86 inches. The optics base 102 has a height of 3.5 inches. A scanner such as the scanner 100 is typically installed in a checkout counter of standard height, with the user positioned in relation to the checkout counter so that the stop surface 110 of the scanner is at a convenient height. In many cases, it may be desirable to use a scanner such as the scanner 100 in a relatively confined environment. In such cases, it may prove advantageous for an operator to sit while using the scanner, positioned so that his or her legs are under the optics base 102. The relatively shallow depth of the optics base 102 makes it possible to position the top surface 110 of the scanner 100 at a standard and convenient height, while providing sufficient clearance underneath the optics base 102 to accommodate a user's legs.

Figure 1C:
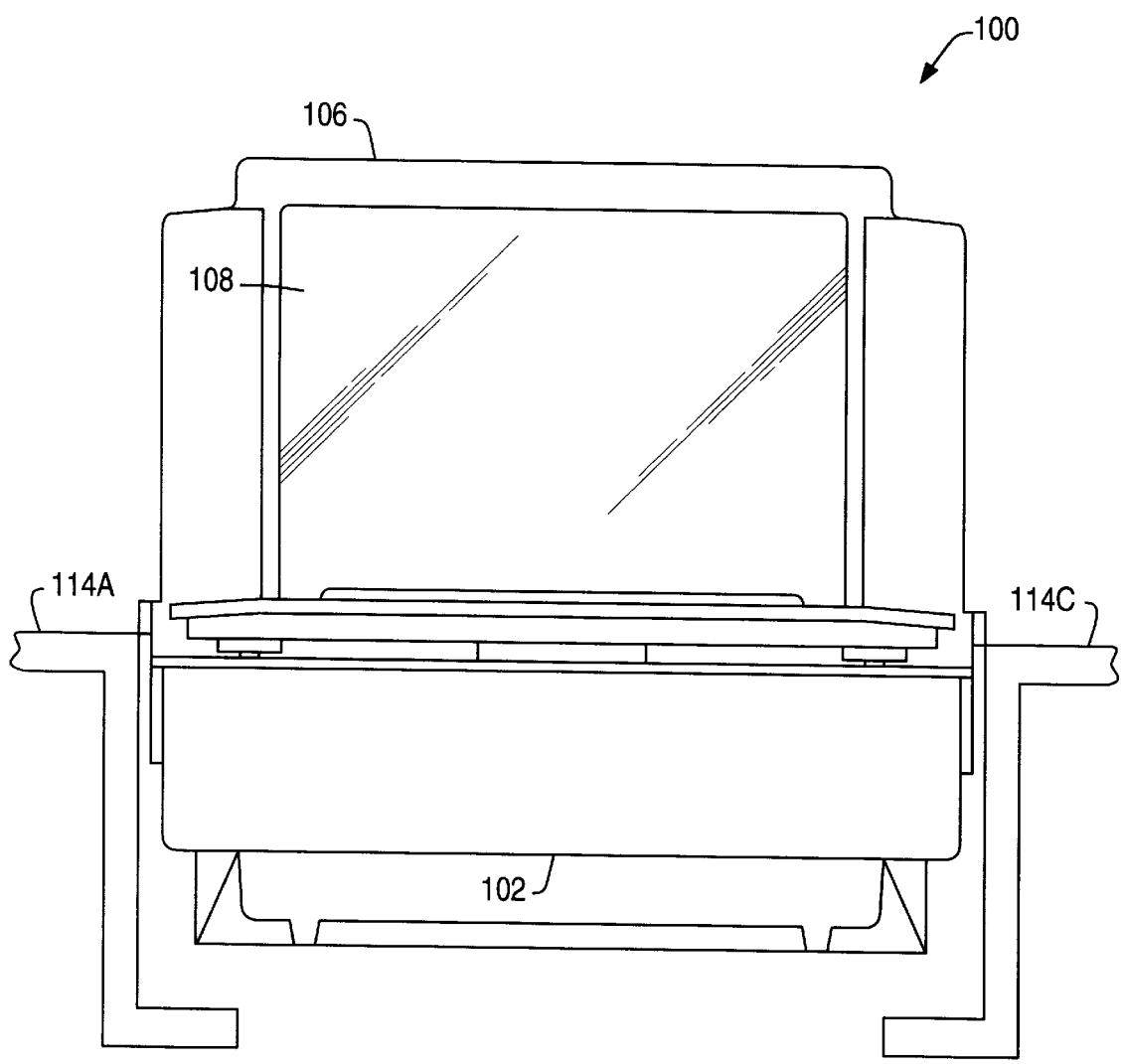
FIG. 1C is a front view of a compact dual aperture scanner according to the present invention.

FIG. 1C is a front view of the scanner 100. The optics base 102 is visible, as well as the tower 106 including the vertical aperture 108. The support 114A is also visible, as well as an additional support 114C.

Figure 1D:
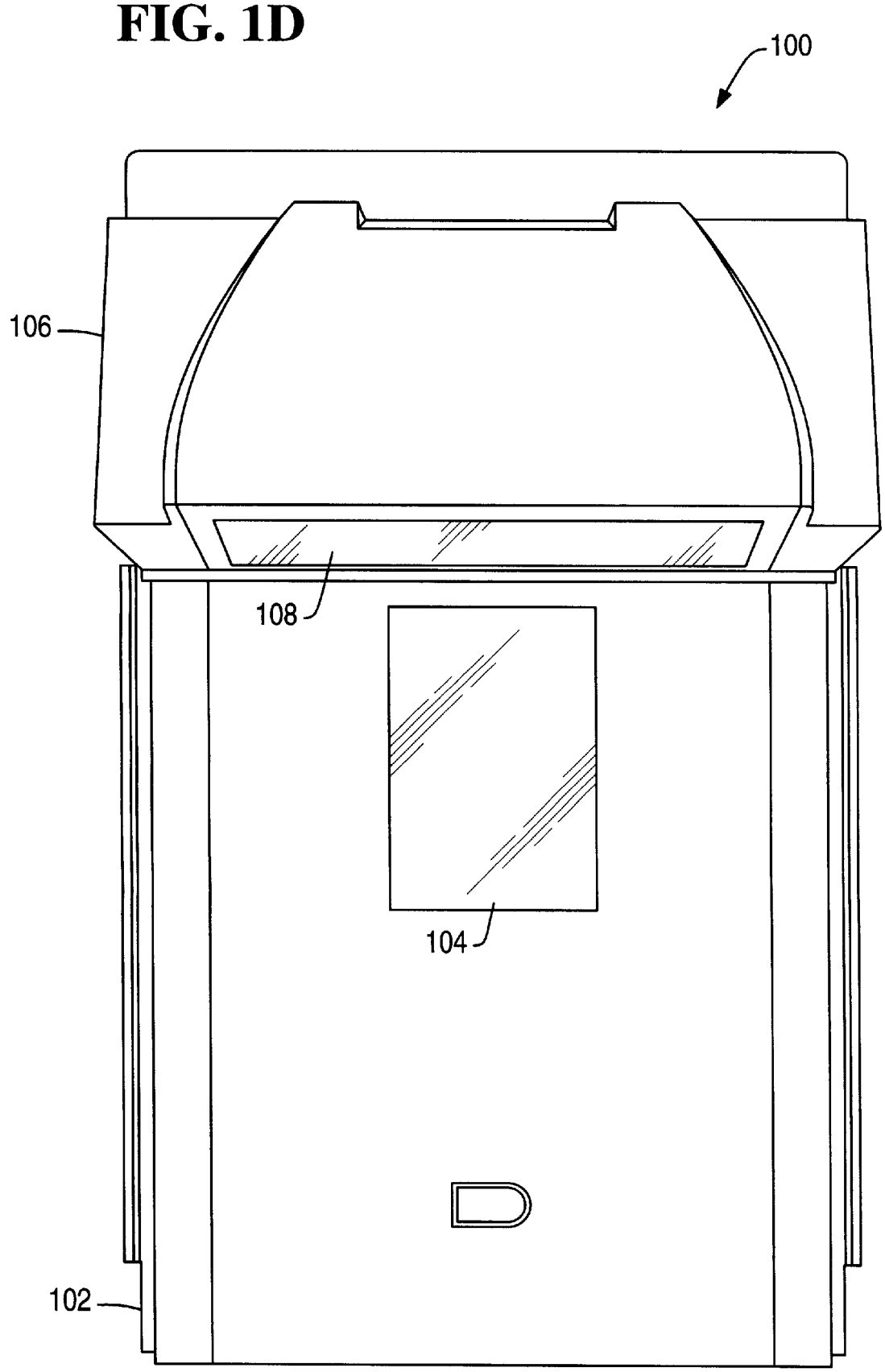
FIG. 1D is a top view of a compact dual aperture scanner according to the present invention.

FIG. 1D is a top down view of the scanner 100. The optics base 102 including the horizontal aperture 104 are visible, as well as the tower 106 including the vertical aperture 108.

Figure 2:
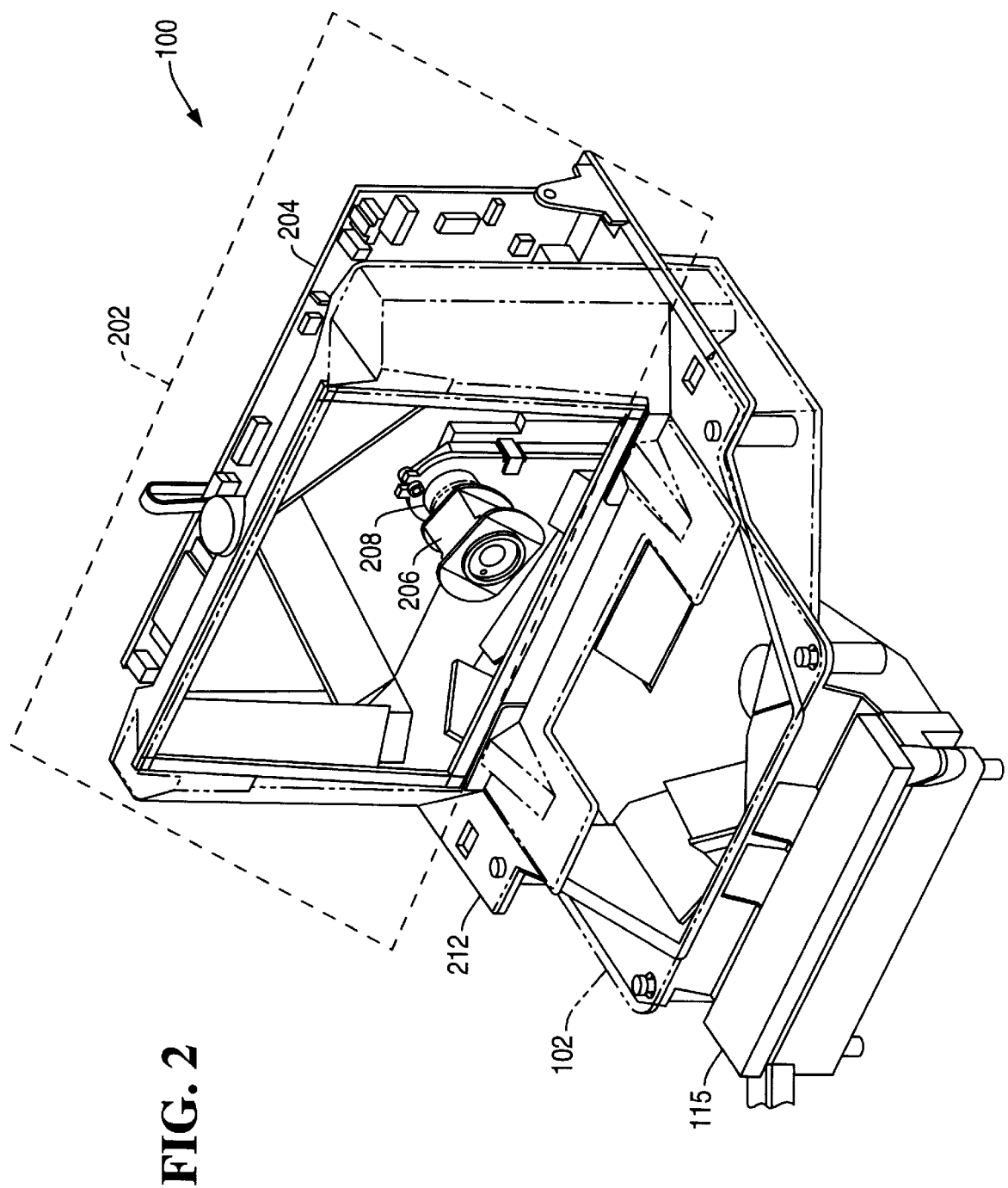
FIG. 2 is an interior view of a compact dual aperture scanner according to the present invention.

FIG. 2 illustrates the scanner 100, showing interior details of the scanner 100. The scanner 100 includes an optics engine 202, comprising a laser generating and detecting circuit 204, a spinner 206, motor 208 and a set of mirrors, all mounted in a mounting block 212. The individual mirrors comprising the set of mirrors can be seen more clearly and will be described in further detail below. The optics engine 202 is installed in the tower 106 of the scanner 100, and can be removed from the scanner 100 simply removing the upper housing of the tower 106 and removing the optics engine 202 from the tower 106. Conversely, the optics engine 202 can be installed in the tower 106 by removing the upper housing of the tower 106 and placing the optics engine 202 into the tower 106.

The optics engine 202 may be removed from the scanner 100 and transported while maintaining the spatial relationships between the various elements contained in the optics engine 202. The optics engine 202 can be operated outside of the scanner 100, allowing design or repair personnel to service the various elements conveniently and to see the light patterns produced by the optics engine 202 and to make adjustments in order to achieve desired scan patterns. Moreover, all he elements of the scanner 100 which require power or signal transfer are in a single location allowing powering of the scanner and signal transfer into and out of the scanner to be accomplished by passing a single cable into the tower 106 of the scanner. Cabling for the scanner 100 is simplified compared to prior art scanners, because prior art scanners typically require power and signals in both the vertical section and the horizontal section. In prior art scanners, therefore, cables are therefore typically passed into the vertical section as well as underneath and into the horizontal section of prior art scanners. This cabling takes up room in the checkout stand in which a prior art scanner is placed, but is not necessary in a scanner such as the scanner 100.

Also shown in FIG. 2 is the optics base 102 including a set of secondary mirrors. The set of secondary mirrors can be seen more clearly and will be described in further detail below. Also visible is the mounting base 115, used to mount the scanner 100 in a checkstand.

Figure 3:
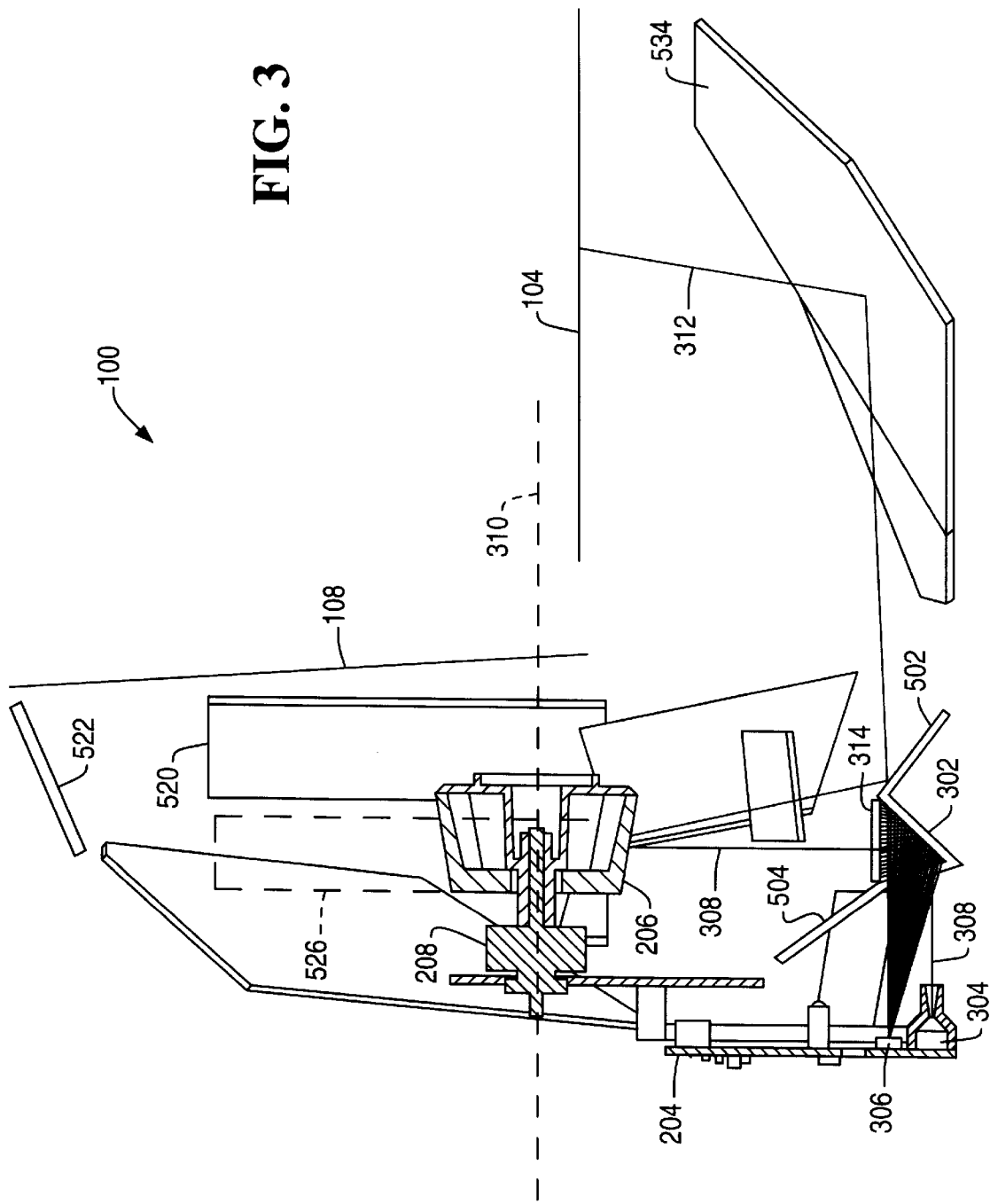
FIG. 3 illustrates additional details of a compact dual aperture scanner according to the present invention.

FIG. 3 is an interior transected view of the compact dual aperture scanner 100. The scanner 100 is shown as transected by a plane passing vertically through the center of the spinner 206. The horizontal and vertical apertures 104 and 108 are visible, as well as the laser generating an detecting circuit 204, spinner 206, motor 208, a deflecting mirror 302 and a set of primary mirrors of which the mirrors 502, 504, and 520 are illustrated here. The laser generating and detecting circuit 204 includes a laser source 304 and a photodetector 306. The deflecting mirror 302 is positioned to the right of the laser source 304, as seen from the perspective of FIG. 3.

The laser source 304 produces a laser beam 308 which travels horizontally from the laser source 304 an which is reflected upward by the deflecting mirror 302. The laser beam 308 strikes the spinner 206. The spinner 206 has four facets and is rectangular in shape. The facets may be viewed as two pairs of two facets each, and will be referred to here as the first, second, third and fourth facets. The first and third facets belong to one pair and the second and fourth facets belong to another pair. The spinner 206 is shown in greater detail in FIG. 4, showing a clearer view of each of the facets.

As the spinner 206 rotates, light from the laser source 304 is reflected by the first, second, third and fourth facets in order. From the perspective shown here, the first and third facets reflect light downward and to the right and the second and fourth facets reflect light downward and to the left. That is, with respect to an imaginary line 310 extending from the axis of rotation of the spinner 206, light is reflected from the first and third facets at an angle of between 0 and −90 degrees with respect to the line 310 and light is reflected from the second and fourth facets at an angle of between −90 and −180 degrees with respect to the line 310. The spinner 206 is able to reflect rays to the left and the right, rather than all to the left or all to the right, because the facets are angled differently. Details of the angles of the different facets are illustrated below in FIGS. 4A–4D. The ability to reflect rays to the left and right allows very fast separation of can lines. Excessively slow separation of scan lines might result in groups of lines which are in parallel in the scan pattern, for example a group of four parallel lines. Such a group of four parallel in lines does not provide any more information when scanning a bar code than would a group of two parallel lines. Fast separation of scan lines allowed by differing angling of the scanner facets allows generation of more scan lines which differ in angle or direction and therefore allows more flexible design of scan patterns.

The laser beam 308 is reflected from the different facets, or scanned, by the spinner 206 to produce fans of rays. Each ray is directed toward one of a set of primary pattern mirrors such as the mirrors 502, 504, and 520. Each ray is further directed by a primary pattern mirror toward one of a set of secondary mirrors such as the mirrors 522, 526 and 534. The rays are reflected from the secondary mirrors through the horizontal and vertical apertures 104 and 108, respectively.

To take specific example, when the laser beam 308 strikes the third facet, it is reflected from the third facet to produce a fan of rays. For clarity in illustration, only one of these rays, the ray 312, is shown here. The ray 312 strikes the primary mirror 502 and is reflected to the secondary mirror 534. The ray 312 is reflected from the secondary mirror 534 and emerges from the horizontal aperture 104. Additional rays and the paths which they follow are illustrated in FIGS. 5B–5F below.

When light emerging from the apertures 104 and 108 strikes a bar code, the light is scattered and a portion of that light is reflected back into the scanner 100 in an expanding cone centered on the incident laser beam. The scattered light passes through the apertures 104 and 108 and strikes in turn the secondary mirrors, the primary mirrors and the spinner 206, where it is de-scanned The de-scanned light reflected from the spinner 206 strikes a collection lens 314, where it is focused and directed toward the photodetector 306. The photodetector 306 produces a photosignal which can be processed to extract bar code information.

It can be seen that the spinner 206 and the motor 208 are located in the tower 106, and the deflecting mirror 302 directs the laser beam 308 to the spinner 206. The primary and secondary mirrors properly direct light out of the horizontal and vertical apertures 104 and 108, allowing for production of desired scan patterns. The primary and secondary mirrors also receive light reflected back into the scanner 100 through the horizontal and vertical apertures 104 and 108 and direct the light in order to allow for bar code detection and decoding. The location of the spinner 206 and the motor 208 and the configuration of mirrors used allows for a compact size for the optics base 102, because there is no need for the optics base 102 to accommodate the bulk of the spinner 206 and motor 208.

Figure 4A:
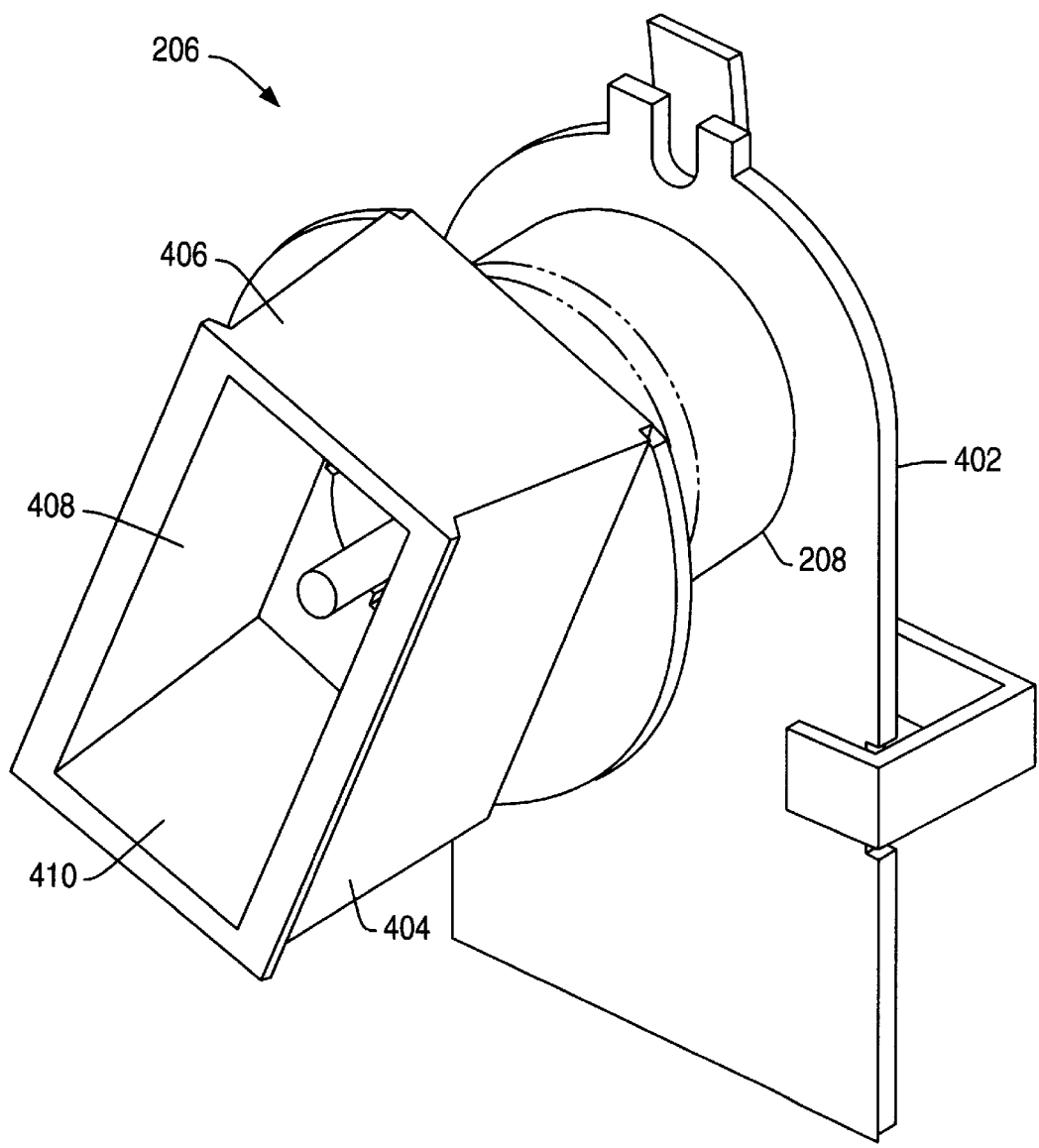
FIG. 4A illustrates a four faceted spinner employed in a compact dual aperture scanner according to he present invention.

FIG. 4A illustrates the spinner 206 in greater detail. The motor 208 and a mounting assembly 402 are also visible. The mounting assembly 402 allows the spinner 206 to be easily mounted on or removed from the optics engine 202. The spinner 206 includes first through fourth facets 404, 406, 408 and 410. The first and third facets 404 and 408 are angled inward and the second and fourth facets 406 and 410 are angled inward.

Figure 4B:
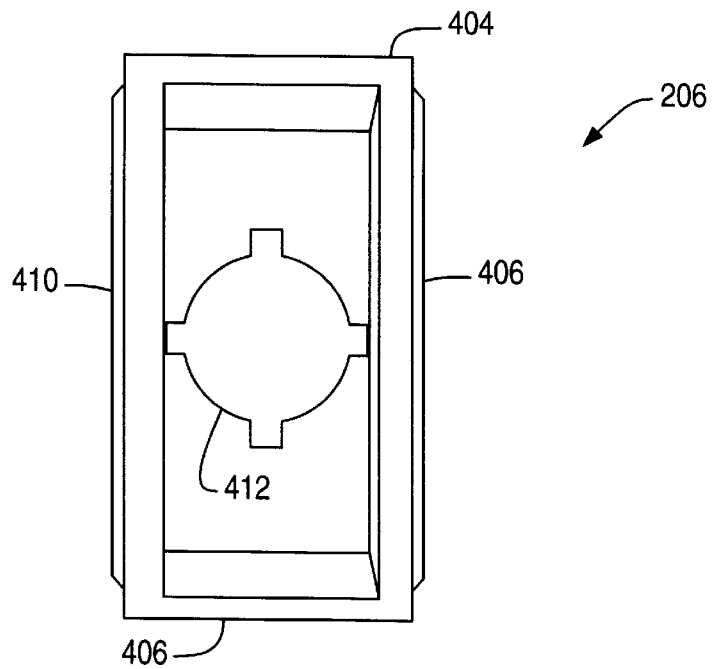
FIG. 4B illustrates an alternative view of a four faceted spinner employed in a compact dual aperture scanner according to the present invention.

FIG. 4B is a top down view of the spinner 206, that is, a view of the spinner 206 as if the spinner 206 had been removed from the motor 208 and laid down with the side facing the motor 208 on the bottom and the side away from the motor 208 on the top. The spinner 206 includes a mounting slot 412. The first through fourth facets 404–410 can also be seen. From the perspective shown, the width of the spinner 206 is the width of the second and fourth facets 406 and 410 and is 0.840 inches. The length of the spinner 206 is the width of the first and third facets and is 1.6 inches.

Figure 4C:
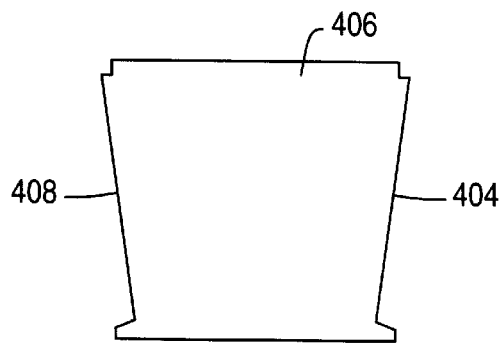
FIG. 4C illustrates a second facet of a four faceted spinner according to the present invention.

FIG. 4C illustrates the second facet 406 of the spinner 206. The first facet 406 has a width of 0.840 inches. The first and third facets 404 and 408 run along opposite edges of the second facet 406. It can be seen from this perspective that the first facet 404 is angled outward at 6.0 degrees and that the third facet 406 is angled outward at 7.5 degrees.

Figure 4D:
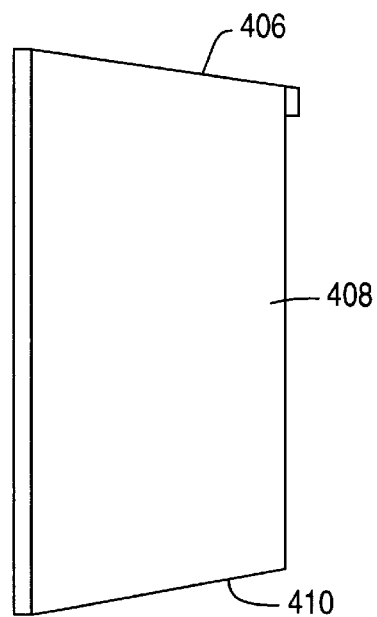
FIG. 4D illustrates a third facet of a four faceted spinner according to the present invention.

FIG. 4D illustrates the third facet 408 of the spinner 206. The third facet 408 has a width of 1.60 inches The second and fourth facets 406 and 410 run along opposite edges of the third facet 408. It can be seen from this perspective that the second facet 406 is angled inward at 8.5 degrees and that the fourth facet 410 is angled outward at 10.0 degrees.

Because the facets 404, 406, 408 and 410 of the spinner 206 are oriented at different angles, the facets 404 and 408 are able to reflect light to the left, from the perspective of FIG. 3, while the facet 406 and 410 are able to reflect light downward and to the right, from the perspective of FIG. 3. The ability of different facets to reflect light in directions having opposite components gives greater flexibility in providing light paths which will use the space available and which will give light rays sufficient length to produce desired scan patterns. Mirrors can be positioned in locations which would not be possible if the facets 404–410 all reflected light rays to the left or to the right. In addition, the ability of the facets to reflect light in the different directions allows for fast separation of scan lines and provides for greater flexibility in the design of scan patterns. Additional details about the advantages of this feature are described below in connection with FIGS. 6A and 6B.

Figure 5A:
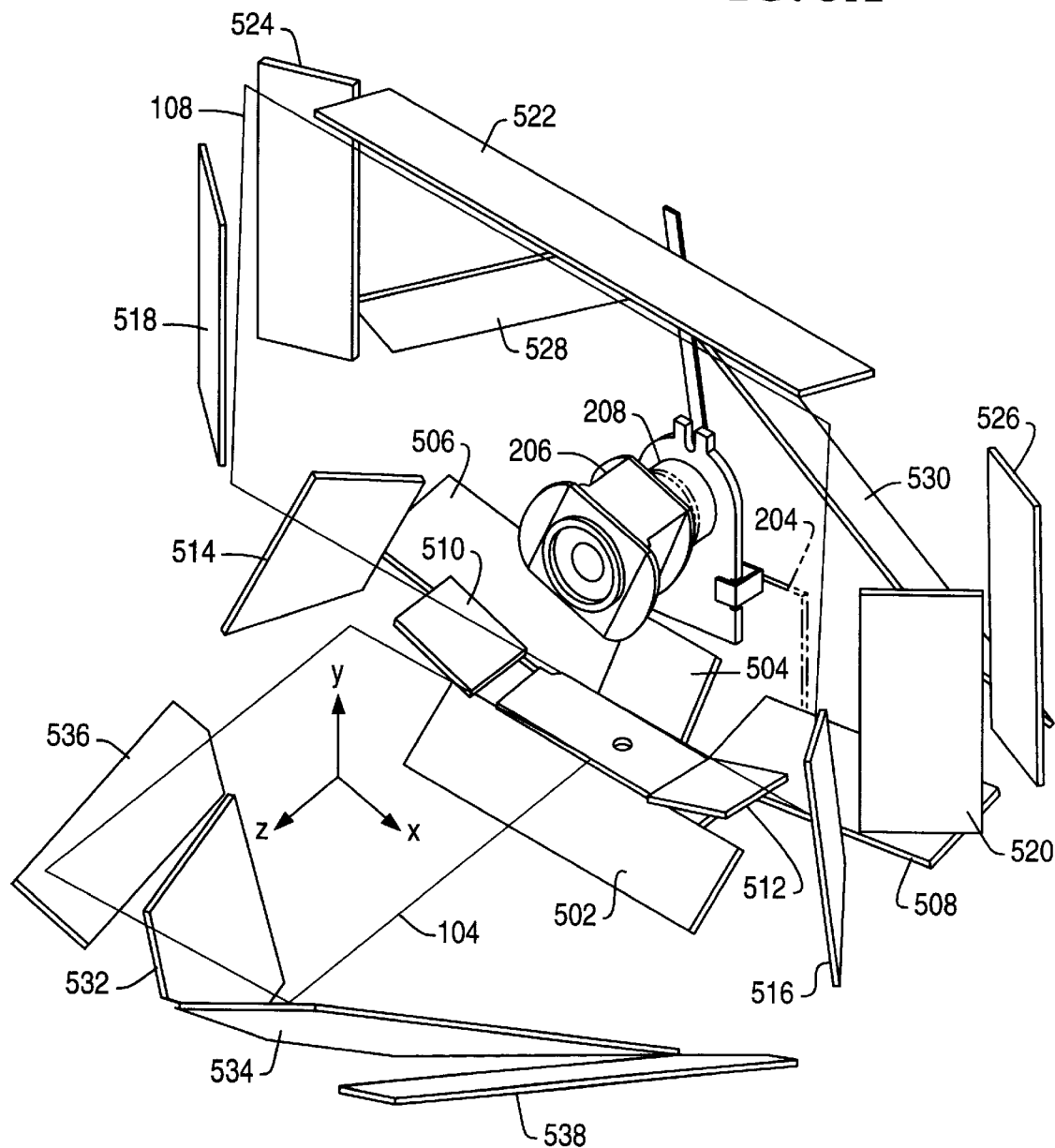
FIG. 5A illustrates additional details of a compact dual aperture scanner according to the present invention, showing relative placement and orientation of elements of the scanner.

FIG. 5A is a perspective view of the interior of the scanner 100, illustrating the horizontal aperture 104, the vertical aperture 108, the laser generating and detecting circuit 204, the spinner 206 and the mirrors 502–538 which reflect light from the spinner 206 to the horizontal aperture 104 and the vertical aperture 108 and which reflect scattered light coming into the scanner 100 through the horizontal aperture 104 and the vertical aperture 108. The mirrors 502–520 are primary mirrors which reflect light coming from the spinner 302 and the mirrors 520–538 are secondary mirrors reflecting light coming from one or more of the primary mirrors 502–520. The relative orientation of the different elements of the scanner 100 can be given by a global coordinate system. For purposes of explanation here, the coordinate system has its origin at the center of the horizontal aperture 104, with x, y and z axes as shown. The x-axis points to the right from the perspective of an observer facing the vertical aperture, the y-axis points in a positive vertical direction and the z-axis points toward an observer facing the vertical aperture, the z-axis pointing in a direction perpendicular to the vertical aperture. The placement of each of the elements is defined in terms of a local coordinate system. Each of the mirrors 502–538 is a flat surface with corners defined by local x and y values, the values being given in inches. The reflecting side of each of the mirrors 502–538 corresponds to the positive z direction. The placement of each element is defined in terms of translation and rotation of the local coordinate system defining the element with respect to the global coordinate system. Each mirror is considered to have its edge initially centered on the global coordinate system, and the values given for translation define the final position of the mirror in terms of movement along the axes of the global coordinate system. Translation, given in inches, defines the position of the mirror, and rotation about the appropriate axes, given in degrees, defines the orientation of the mirror. Rotation of each mirror is given in terms of the mirror's own local coordinate system.

Thus, the placement of the different elements of the scanner 100 is as follows.

| Element | |
|---|---|
| Element | Horizontal aperture 104 |
| Corners (x,y) | (1.625, −2.500), (1.625, 2.500), (−1.625, 2.500),) (−1.625, −2.500) |
| Translation (x,y,z) | (0.000, 0.000, 0.000) |
| Rotation (z,x) | (0.0, −90.0) |
| Element | Vertical aperture 108 |
| Corners (x,y) | (4.225, 0.000), (4.225, 6.325), (−4.225, 6.325), (−4.225, 0.000) |
| Translation (x,y,z) | (0.000, −0.250, −3.300) |
| Rotation (z,x) | (0.0, −3.5) |
| Element | Laser source 304 |
| Translation (x,y,z) | (0.000, −3.200, −6.625) |
| Element | Deflecting mirror 302 |
| Corners (x,y) | (1.175, −0.575), (1.175, 0.25), (−1.175, 0.25), (−1.175, −0.575) |
| Translation (x,y,z) | (0.000, −3.200, −5.000) |
| Rotation (z,x) | (0.0, −135.0) |
| Element | Collection lens 314 |
| Corners (x,y) | (1.225, −0.400), (1.225, 0.400), (−1.225, 0.400), (−1.225, −0.400) |
| Translation (x,y,z) | (0.000, −3.200, −5.000) |
| Rotation (z,x) | (0.0, −90.0) |
| Element | Spinner 206 |
| Translation (x,y,z) | (0.000, 0.400, −5.000) |
| Element | Primary inner horizontal x mirror 502 |
| Corners (x,y) | (2.000, −1.040), (2.000, 0.000), (−2.000, −1.040), (−2.000, −1.400) |
| Translation (x,y,z) | (0.000, −1.800, −6.000) |
| Rotation (z,x) | (0.0, −52.5) |
| Element | Primary outer horizontal x mirror 504 |
| Corners (x,y) | (0.575, −1.050), (0.575, 0.000), (−0.575, −1.050), (−0.575, −1.050) |
| Translation (x,y,z) | (0.000, −1.800, −6.000) |
| Rotation (z,x) | (0.0, −37.0) |
| Element | Primary left vertical x mirror 506 |
| Corners (x,y) | (0.000, 0.000), (0.000, 1.200), (−3.080, 1.200), (−3.080, 0.000) |
| Translation (x,y,z) | (−0.725, −2.900, −5.375) |
| Rotation (z,x) | (−10.5, −80.0) |
| Element | Primary right vertical x mirror 508 |
| Corners (x,y) | (0.000, 0.000), (0.000, 1.200), (3.080, 1.200), (3.080, 0.000) |
| Translation (x,y,z) | (0.725, −2.900, −5.375) |
| Rotation (z,x) | (10.5, −80.0) |
| Element | Primary left vertical top mirror 510 |
| Corners (x,y) | (0.000, −0.9800), (0.000, 0.000), (−1.120, 0.000), (−1.120, −0.980) |
| Translation (x,y,z) | (−1.300, −2.025, −4.950) |
| Rotation (z,x) | (−22.5, −97.0) |
| Element | Primary right vertical top mirror 512 |
| Corners (x,y) | (0.000, −0.980), (0.000, 0.000), (1.120, 0.000), (1.120, −0.980) |
| Translation (x,y,z) | (1.300, −2.025, −4.950) |
| Rotation (z,x) | (−22.5, −97.0) |
| Element | Primary left horizontal mirror 514 |
| Corners (x,y) | (1.850, 0.000), (1.850, 1.300), (−0.900, 1.300), (0.000, 0.000) |
| Translation (x,y,z) | (−3.275, −2.150, −4.650) |
| Rotation (z,x,z) | (−80.0, 55.0, −13.5) |
| Element | Primary right horizontal mirror 516 |
| Corners (x,y) | (−1.850, 0.000), (−1.850, 1.300), (0.900, 1.300), (0.000, 0.000) |
| Translation (x,y,z) | (3.275, −2.150, −4.650) |
| Rotation (z,x,z) | (−80.0, 55.0, 13.5) |
| Element | Primary left vertical mirror 518 |
| Corners (x,y) | (0.000, 0.000), (0.000, 1.300), (−3.700, 1.300), (−3.700, 0.000) |
| Translation (x,y,z) | (−5.325, −3.450, −4.600) |
| Rotation (z,x) | (−90.0, 140.0) |
| axis translation (x,y,z) | (−4.300, 0.000, −0.100 |
| axis rotation (y) | (−0.25) |
| Element | Primary right vertical mirror 520 |
| Corners (x,y) | (0.000, 0.000), (0.000, 1.300), (3.700, 1.300), (3.700, 0.000) |
| Translation (x,y,z) | (5.325, 3.450, −4.600) |
| Rotation (z,x) | (−90.0, 140.0) |
| axis translation (x,y,z) | (4.300, 0.000, −0.100 |
| axis rotation (y) | (0.25) |
| Element | Secondary vertical top mirror 522 |

-continued

| | |
|---|---|
| Corners (x,y) | (3.350, −1.430), (3.350, 0.000), (−3.350, 0.000), (−3.350, −1.430) |
| Translation (x,y,z) | (0.000, 5.675, −3.850) |
| Rotation (z,x) | (−0.0, 62.5) |
| Element | Secondary left vertical mirror 524 |
| Corners (x,y) | (0.000, −1.050), (0.000, 0.000), (−4.300, 0.000), (−4.300, −1.050) |
| Translation (x,y,z) | (−5.325, 4.050, −5.425) |
| Rotation (z,x) | (89.0, 22.5) |
| Element | Secondary right vertical mirror 526 |
| Corners (x,y) | (0.000, −1.050), (0.000, 0.000), (4.300, 0.000), (4.300, −1.050) |
| Translation (x,y,z) | (5.325, 4.050, −5.425) |
| Rotation (z,x) | (−89.0, 22.5) |
| Element | Secondary left vertical x mirror 528 |
| Corners (x,y) | (0.000, 0.000), (1.500, 1.500), (1.450, 1.650), (−3.687, 1.650), (−4.357, 1.300), (−5.657, 0.000) |
| Translation (x,y,z) | (−0.400, 3.050, −6.300) |
| Rotation (z,x,z) | (40.0, 46.5, 4.5) |
| Element | Secondary right vertical x mirror 530 |
| Corners (x,y) | (0.000, 0.000), (−1.500, −1.500), (−1.450, −1.650), (3.687, 1.650), (4.357, 1.300), (5.657, 0.000) |
| Translation (x,y,z) | (0.400, 3.050, −6.300) |
| Rotation (z,x,z) | (−40.0, 46.5, −4.5) |
| Element | Secondary left horizontal x mirror 532 |
| Corners (x,y) | (2.996, 0.000), (−0.859, 2.750), (−2.300, 2.750), (−1.498, 1.068), (0.000, 0.000) |
| Translation (x,y,z) | (−0.775, −3.350, −0.350) |
| Rotation (y,x,z) | (140.0, −35.0, 0.0) |
| Element | Secondary right horizontal x mirror 534 |
| Corners (x,y) | (−2.996, 0.000), (0.859, 2.750), (2.300, 2.750), (1.498, 1.068), (0.000, 0.000) |
| Translation (x,y,z) | (0.775, −3.350, −0.350) |
| Rotation (y,x,z) | (−140.0, −35.0, 0.0) |
| Element | Secondary left horizontal mirror 536 |
| Corners (x,y) | (0.000, 0.000), (0.800, 0.600), (0.800, 1.050), (−4.450, 1.050), (−4.450, 0.000) |
| Translation (x,y,z) | (−3.125, −3.350, −2.200) |
| Rotation (y,x,z) | (140.0, −52.5, −35.5) |
| Element | Secondary right horizontal mirror 538 |
| Corners (x,y) | (0.000, 0.000), (−0.800, 0.600), (−0.800, 1.050), (4.450, 1.050), (4.450, 0.000) |
| Translation (x,y,z) | (3.125, −3.350, −2.200) |
| Rotation (y,x,z) | (−140.0, −52.5, −35.5) |

As the laser beam 308 is scanned by the spinner 206, the rays produced by scanning of the laser beam 308 are directed outward from the spinner 206. The orientation of the primary and secondary mirrors allows some of the rays to be directed by one or more mirrors in paths which take them in the direction of the spinner and in the same plane as the spinner before they are deflected by another mirror or directed out of the horizontal aperture 104 or the vertical aperture 108. In order to design a desired scan pattern, a chosen path length must be provided for each ray making up the scan pattern, in order for the ray to be focused properly as it leaves the aperture from which it is emitted. The use of space near the spinner 206 in the designing of paths allows for light paths to be effectively lengthened without introducing a need for increasing the size of the optics base 102 or the tower 106 in order to provide this lengthening. This use of space particularly simplifies design of scan lines which emerge from the vertical aperture 108, as can be seen in FIG. 5B below.

Figure 5B:
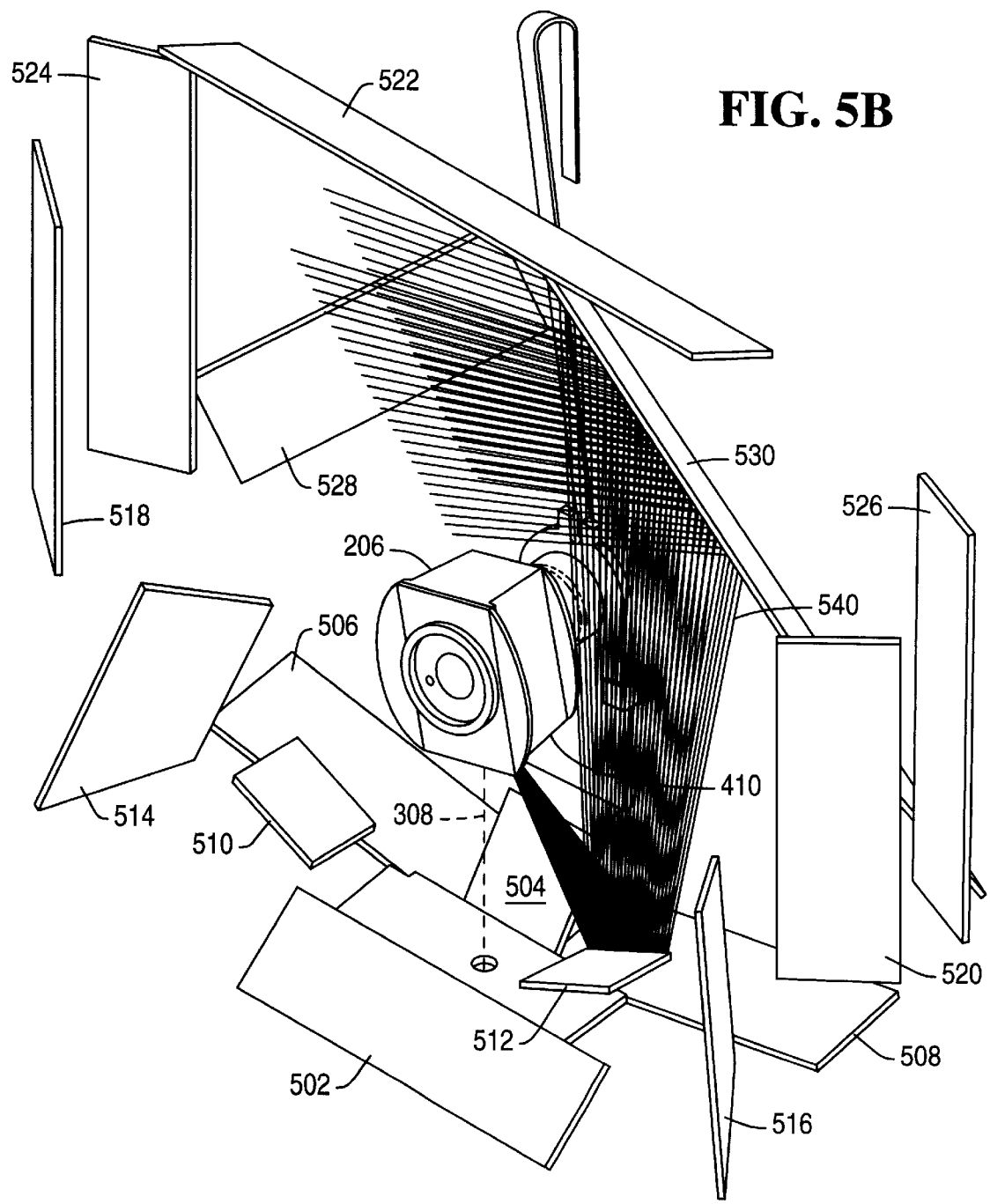
FIG. 5B illustrates a fan of light rays following a representative path within a scanner according to the present invention.

FIG. 5B illustrates a specific example of a light path within the scanner 100. The spinner 206 is visible, as well as the primary and secondary mirrors 502–530. The laser beam 308 is reflected from the fourth facet 410 of the spinner 206 to form a fan of rays 540. The fan of rays 540 is directed to the primary right vertical x mirror 508, to the secondary right vertical x mirror 530, to the vertical aperture 108. It can be seen that even though the spinner 206 is relatively close to the vertical aperture 108, the mirrors 508 and 530 are positioned such that the light rays 540 travel a substantial distance in their path to the vertical aperture 108. The length of the path of the light rays 540 is due in part to the fact that part of the path of the light rays 540 is in the vicinity of the spinner 206. The light rays 540 are initially reflected away from the spinner 206 and are then reflected back to the vicinity of the spinner 206 by the mirror 508. After the light rays 540 pass the spinner 206, they are reflected by the mirror 530 in a direction which takes them past the spinner and to and out of the vertical aperture 108. It can be seen, therefore, that the orientation of the mirrors 508 and 530 with respect to the second facet 406 of the spinner 206 takes advantage of the space near the spinner to provide a path of desired length for the light rays 540. Because the light path takes advantage of space within the tower 106, the design of the scan line produced by the light rays 540 is simplified. It is easier to provide a path for the light rays 540 entirely within the tower 106, while still providing a path of desired length for the light rays 540. It is not necessary to locate the spinner 206 in the optics base 102 to provide the desired path length, or to design the light path so part of the path is within the optics base 102.

Figure 5C:
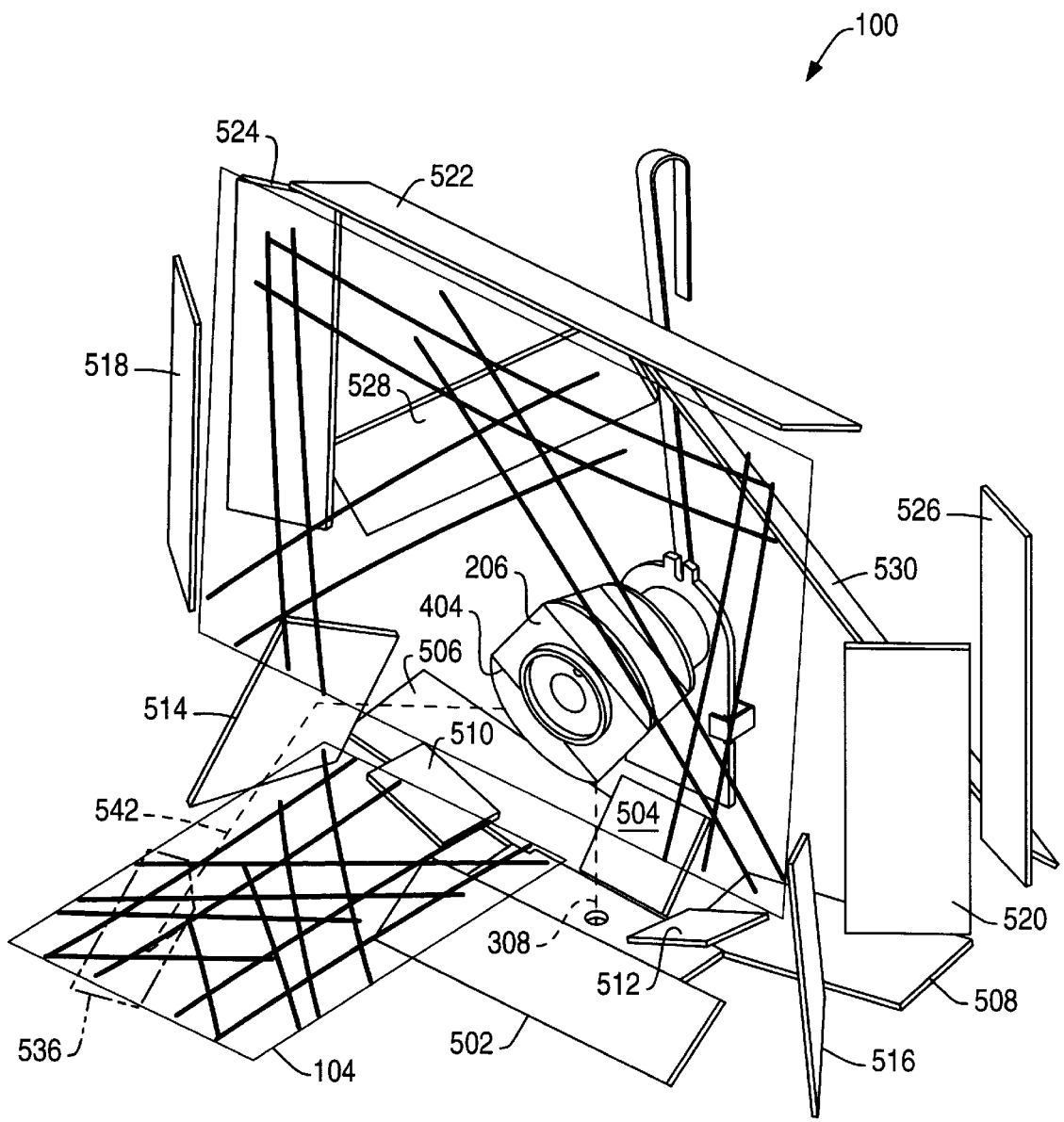
FIG. 5C illustrates a light ray following a representative path within a scanner according to the present invention.

FIG. 5C illustrates scan patterns at each of the apertures 104 and 108 of the scanner 100, as well as the path of a representative light ray 542 which produces one of the lines of the scan pattern at the aperture 104. The spinner 206 is visible, as well as the primary and secondary mirrors 502–530, and the secondary mirror 536. The scan patterns at the apertures 104 and 108 are illustrated in greater detail in FIGS. 6A and 6B below.

The ray 542 is produced by reflection of the laser beam 308 off the first facet 404 of the spinner 206. The light ray 542 travels from the facet 404 to the primary left horizontal mirror 514, to the secondary left horizontal mirror 536, to the horizontal aperture 104. The light ray 542 is reflected from the spinner 206 in a direction having a horizontal component toward the front of the scanner 100.

Figure 5D:
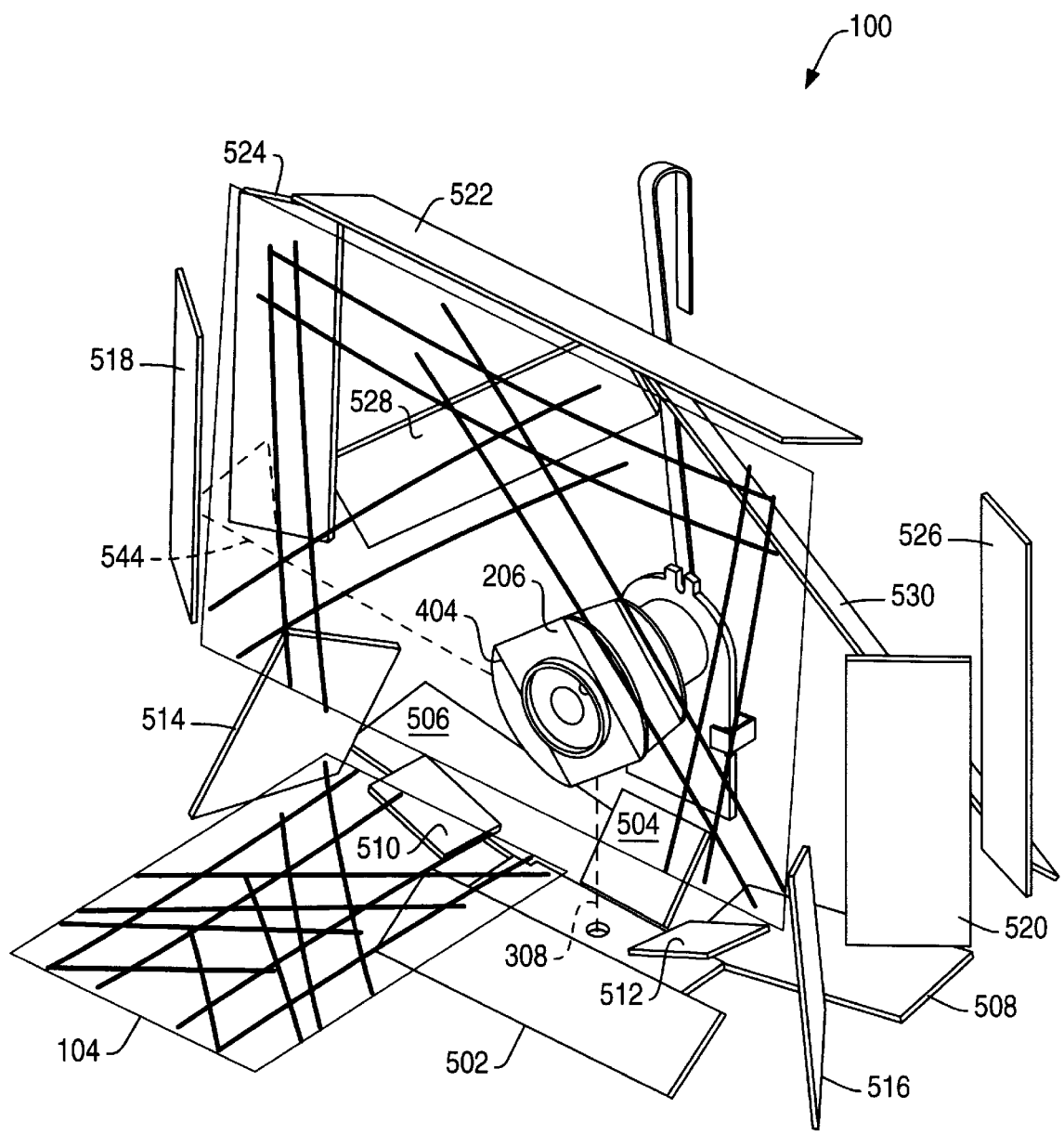
FIG. 5D illustrates a light ray following a representative alternative path within a scanner according to the present invention.

FIG. 5D illustrates scan patterns at each of the apertures 104 and 108 of the scanner 100, as well as the path of a representative light ray 544, which produces one of the lines of the scan pattern at the aperture 108. The spinner 206 is visible, as well as the primary and secondary mirrors 502–530. The light ray 544 is produced by reflection of the laser beam 308 off the first facet 404 of the spinner 206. The light ray 544 travels from the facet 404 to the primary vertical mirror 518, to the secondary left vertical mirror 524, to the vertical aperture 104. The light ray 544 is reflected from the spinner 206 in a direction having a horizontal component toward the front of the scanner 100.

Figure 5E:
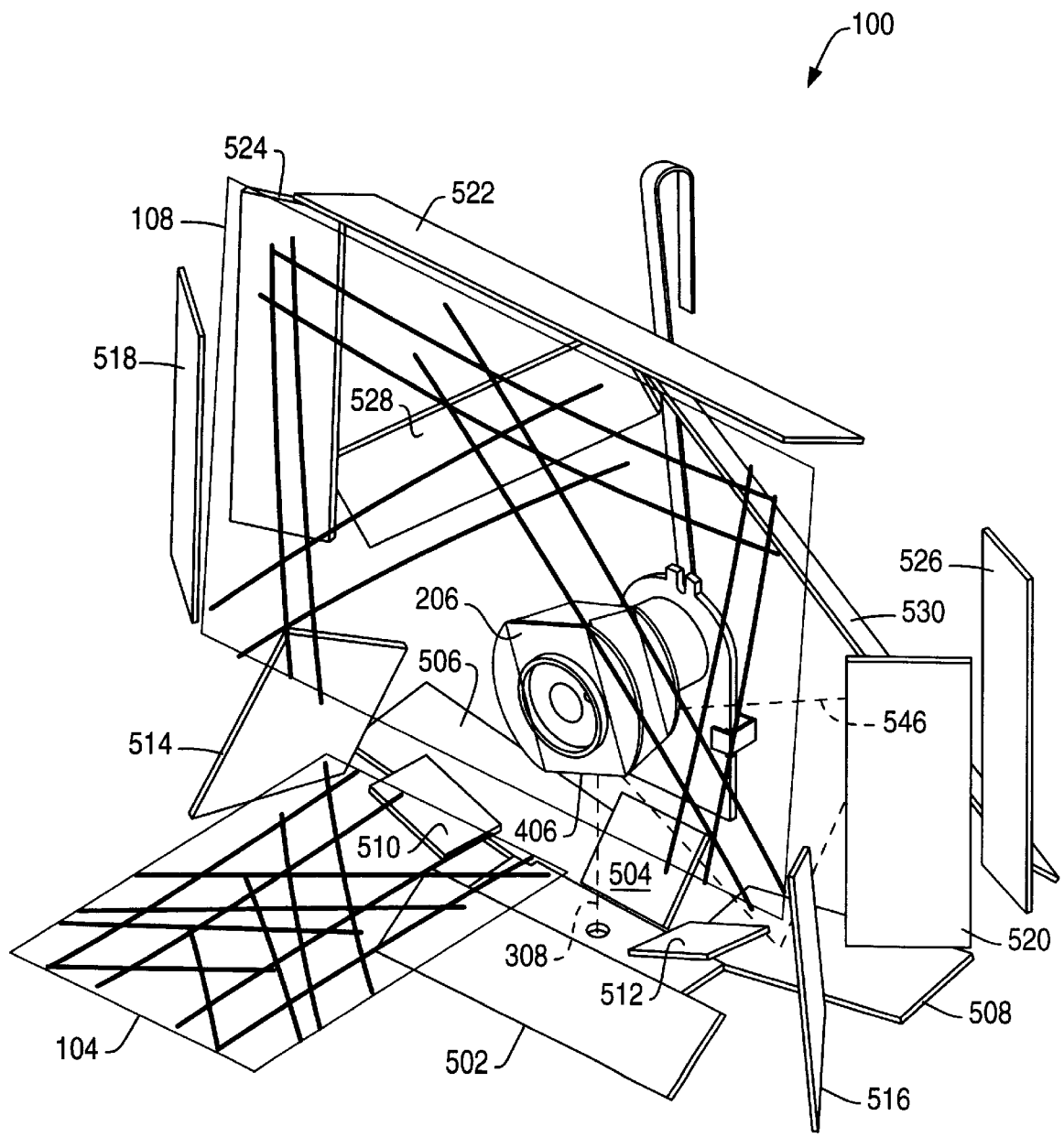
FIG. 5E illustrates a light ray following a further representative alternative path within a scanner according to the present invention.

FIG. 5E illustrates scan patterns at each of the apertures 104 and 108 of the scanner 100, as well as the path of a representative light ray 546 which produces one of the lines of the scan pattern at the aperture 108. The spinner 206 is visible, as well as the primary and secondary mirrors 502–530. The light ray is produced by reflection of the laser beam 308 off the second facet 406 of the spinner 206. The light ray 546 travels from the facet 406 to the primary right vertical x mirror 508, to the secondary right vertical x mirror 530, to the vertical aperture 108.

Because of the angle of the facet 406, the ray 546 has an initial direction of travel having a horizontal component toward the rear of the scanner 100. That is, the ray 546 is reflected from the facet 406 at an angle between −90 and −180 degrees from an imaginary line extending through the axis of rotation of the spinner 206. As illustrated by FIGS. 5C and 5D above, the rays 542 and 544 produced by the first facet 404 have an initial direction of travel having a horizontal component toward the front of the scanner 100, that is, they are reflected from the first facet 404 at angles between 0 and −90 degrees from an imaginary line extending through the axis of rotation of the spinner 206. Because the different facets of the spinner 206 are able to direct rays in these different directions, rapid separation of scan lines is produced. The number of duplicate scan lines is reduced, and easier and more flexible design of scan patterns is achieved.

Figure 5F:
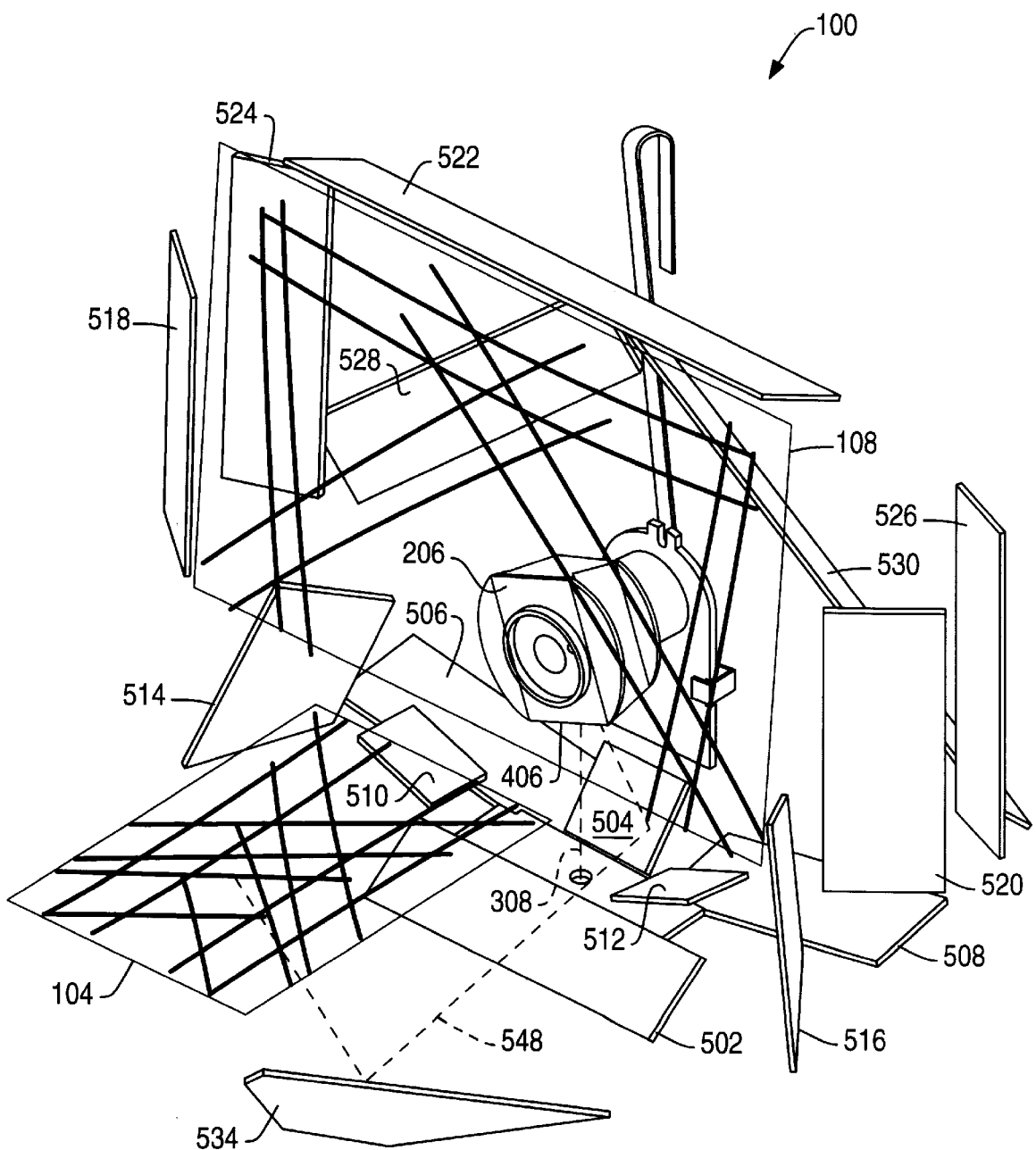
FIG. 5F illustrates a light ray following a further representative alternative path within a scanner according to the present invention.

FIG. 5F illustrates scan patterns at each of the apertures 104 and 108 of the scanner 100, as well as the path of a representative light ray 548 which produces one of the lines of the scan pattern at the aperture 104. The spinner 206 is visible, as well as the primary and secondary mirrors 502–530, and the secondary mirror 534. The light ray 548 is produced by reflection of the laser beam 308 off the second facet 406 of the spinner 206. The light ray 546 travels from the facet 406 to the primary left vertical top mirror 504, to the secondary vertical top mirror 534, to the horizontal aperture 104. The light ray 548 is reflected from the spinner 206 in a direction having a horizontal component toward the rear of the scanner 100.

Figure 6A:
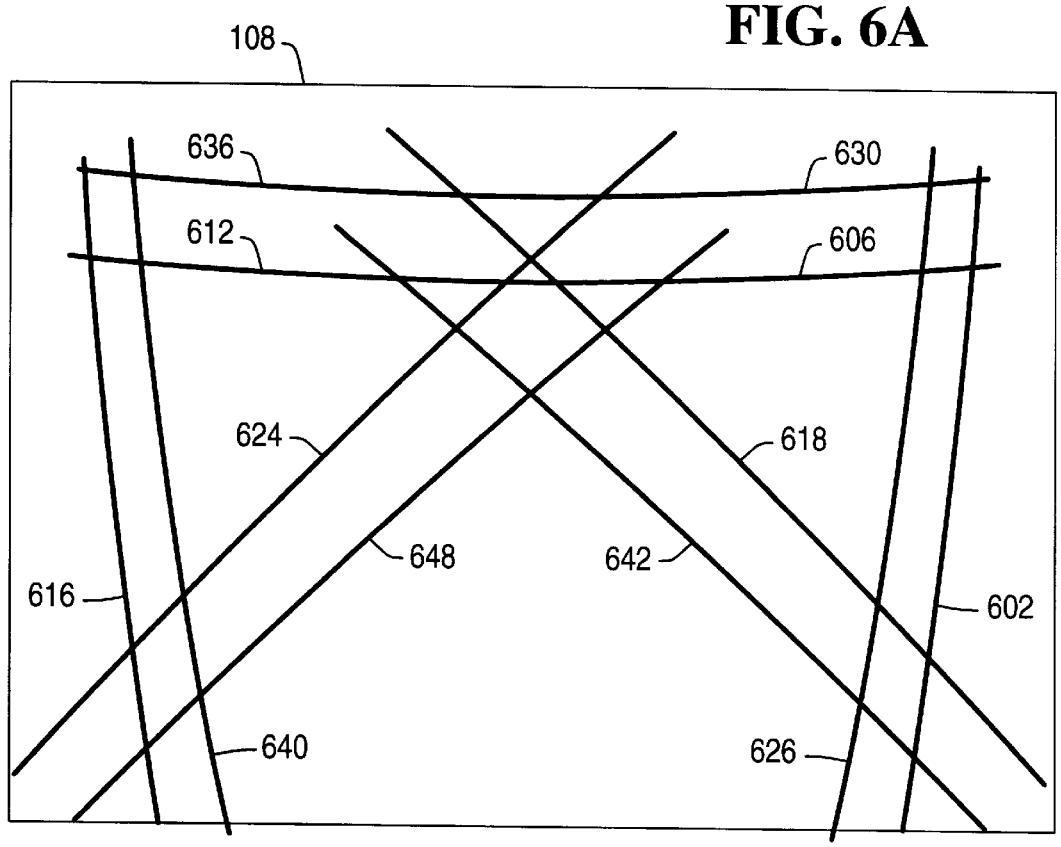
FIG. 6A illustrates a ray pattern at a vertical aperture of a compact dual aperture scanner according to the present invention.
Figure 6B:
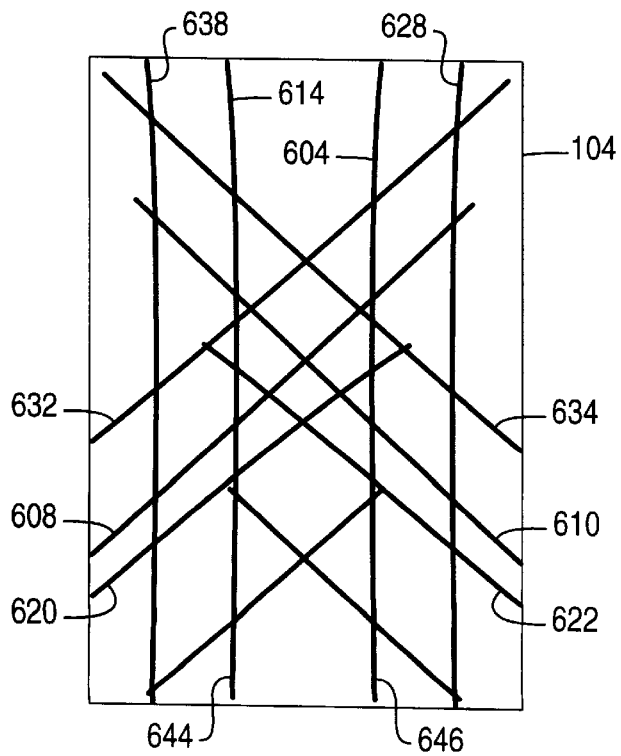
FIG. 6B illustrates a ray pattern at a horizontal aperture of a compact dual aperture scanner according to the present invention.

The scanner 100 produces a scan pattern at each of the horizontal and vertical apertures 104 and 108, respectively. Each of the scan patterns is a set of scan lines. Each of the scan lines is produced by reflecting laser light from the laser source 314 to the deflecting mirror 302, from the deflecting mirror 302 to one of the facets 404–410 of the spinner 206, from the spinner 206 to one of the primary mirrors, to one of the secondary mirrors, and to the horizontal or vertical aperture. FIG. 6A illustrates the vertical aperture 108 showing the scan lines produced at the vertical aperture 108 and FIG. 6B illustrates the horizontal aperture 104 showing the scan lines produced at the horizontal aperture 104.

Each of the scan lines is produced by a series of reflections of the laser beam 315 from each of a particular sequence of mirrors, as described below with respect to each scan line. In order to produce a scan line, the laser beam strikes a facet of the spinner 206 and is reflected to produce a plurality of light rays, each of which strikes a particular primary mirror and then a particular secondary mirror, and is then emitted at either the horizontal aperture 104 or the vertical aperture 108. The sequence of reflections producing each of the scan lines is shown below.

| Scan line | Spinner facet | Primary mirror | Secondary mirror | Aperture |
|---|---|---|---|---|
| 602 | 404 (1st) | 520 (Right vertical) | 526 (Right vertical) | 108 (Vertical) |
| 604 | 404 (1st) | 516 (Right horizontal) | 538 (Right horizontal) | 104 (Horizontal) |
| 606 | 404 (1st) | 512 (Right vertical top) | 522 (Vertical top) | 108 (Vertical) |
| 608 | 404 (1st) | 502 (Inner horizontal x) | 534 (Right horizontal x) | 104 (Horizontal) |
| 610 | 404 (1st) | 502 (Inner horizontal x) | 528 (Left horizontal x) | 104 (Horizontal) |
| 612 | 404 (1st) | 510 (Left vertical top) | 522 (Vertical top) | 108 (Vertical) |
| 614 | 404 (1st) | 514 (Left horizontal) | 536 (Left Horizontal) | 104 (Horizontal) |
| 616 | 404 (1st) | 518 (Left vertical) | 524 (Left vertical) | 108 (Vertical) |
| 618 | 406 (2nd) | 508 (Right vertical x) | 530 (Right Vertical x) | 108 (Vertical) |
| 620 | 406 (2nd) | 504 (Outer horizontal x) | 534 (Right horizontal x) | 104 (Horizontal) |
| 622 | 406 (2nd) | 504 (Outer horizontal x) | 532 (Left horizontal x) | 104 (Horizontal) |
| 624 | 406 (2nd) | 506 (Left vertical x) | 528 (Left vertical x) | 108 (Vertical) |
| 626 | 408 (3rd) | 520 (Right vertical) | 526 (Right vertical) | 108 (Vertical) |
| 628 | 408 (3rd) | 516 (Right horizontal) | 538 (Right horizontal) | 104 (Horizontal) |
| 630 | 408 (3rd) | 512 (Right vertical top) | 522 (Vertical top) | 108 (Vertical) |
| 632 | 408 (3rd) | 502 (Inner horizontal x) | 534 (Right horizontal x) | 104 (Horizontal) |
| 634 | 408 (3rd) | 502 (Inner horizontal x) | 532 (Left horizontal x) | 104 (Horizontal) |
| 636 | 408 (3rd) | 510 (Left vertical top) | 522 (Vertical top) | 108 (Vertical) |
| 638 | 408 (3rd) | 514 (Left horizontal) | 536 (Left horizontal) | 104 (Horizontal) |
| 640 | 408 (3rd) | 518 (Left vertical) | 524 (Left vertical) | 108 (Vertical) |
| 642 | 410 (4th) | 508 (Right vertical x) | 530 (Right vertical x) | 108 (Vertical) |
| 644 | 410 (4th) | 504 (Outer horizontal x) | 534 (Right horizontal x) | 104 (Horizontal) |
| 646 | 410 (4th) | 504 (Outer horizontal x) | 532 (Left horizontal x) | 104 (Horizontal) |
| 648 | 410 (4th) | 506 (Left vertical x) | 528 (Left vertical x) | 108 (Vertical) |

Each of the scan lines 602–648 is produced in order, at which point the pattern repeats.

The horizontal aperture 104 is relatively small because the material covering the horizontal aperture must be durable enough to withstand direct contact by products passing over it during scanning. The covering for the aperture 104 is preferably sapphire, diamond, or some other extremely sturdy and durable material, with a high resistance to scratching. Excessive scratching of the aperture covering would severely degrade the performance of the scanner 100, eventually rendering scanning through the horizontal aperture impossible.

Because of the need to produce a scan pattern which will provide sufficient information at relatively small horizontal aperture 104, it is beneficial to have flexibility in creating a scan pattern which will produce the needed information. The diagonal scan lines 608, 610, 620, 622, 634, 644 and 646 are particularly valuable in providing scan information. In designing diagonal lines in a scan pattern, it is important to avoid generating an excessive number of relatively diagonal lines. This is particularly important in producing a scan pattern for a relatively small aperture such as the horizontal aperture 104, because there is little excess room in the scan pattern to produce additional useful lines to supplement the duplicate lines.

The use of differing mirror angles for the facets of the spinner 206 enables the spinner 206 to generate rays oriented in opposite directions. This ability allows the rapid separation of lines, avoiding an excessive number of duplicate lines. As the spinner 206 rotates, rays produced by the spinner are directed to different mirrors to produce scan lines. If the spinner 206 did not employ differing angles for the facets 404–410, scan lines produced in close proximity to one another might be produced by reflections from different areas of the same mirrors. For example, a sequence of four scan lines might be produced by reflection of rays produced by the spinner 206 from the same mirrors, resulting in a set of four parallel scan lines which would not return any more information in a scan than would a sequence of two parallel scan lines.

By providing facets with differing angles, the design of the spinner 206 allows the generation of the lines 608, 610, 620, 622, 632, 634, 644 and 646. The lines 632 and 644 provide substantially different information than do the lines 608 and 620, and the lines 634 and 646 provide substantially different information than do the lines 610 and 622.

The scan lines 604, 614, 628 and 638 are vertical scan lines and are useful for reading the area of a bar code which is in the scan plane, as well as leading edge or trailing edges of bar codes. The use of a rectangular design for the spinner 206 aids in the design of the vertical scan lines 604, 614, 628 and 638 by preventing foreshortening of the lines. If a square spinner were used as the spinner 206, the vertical lines would tend to be foreshortened.

Figure 7:
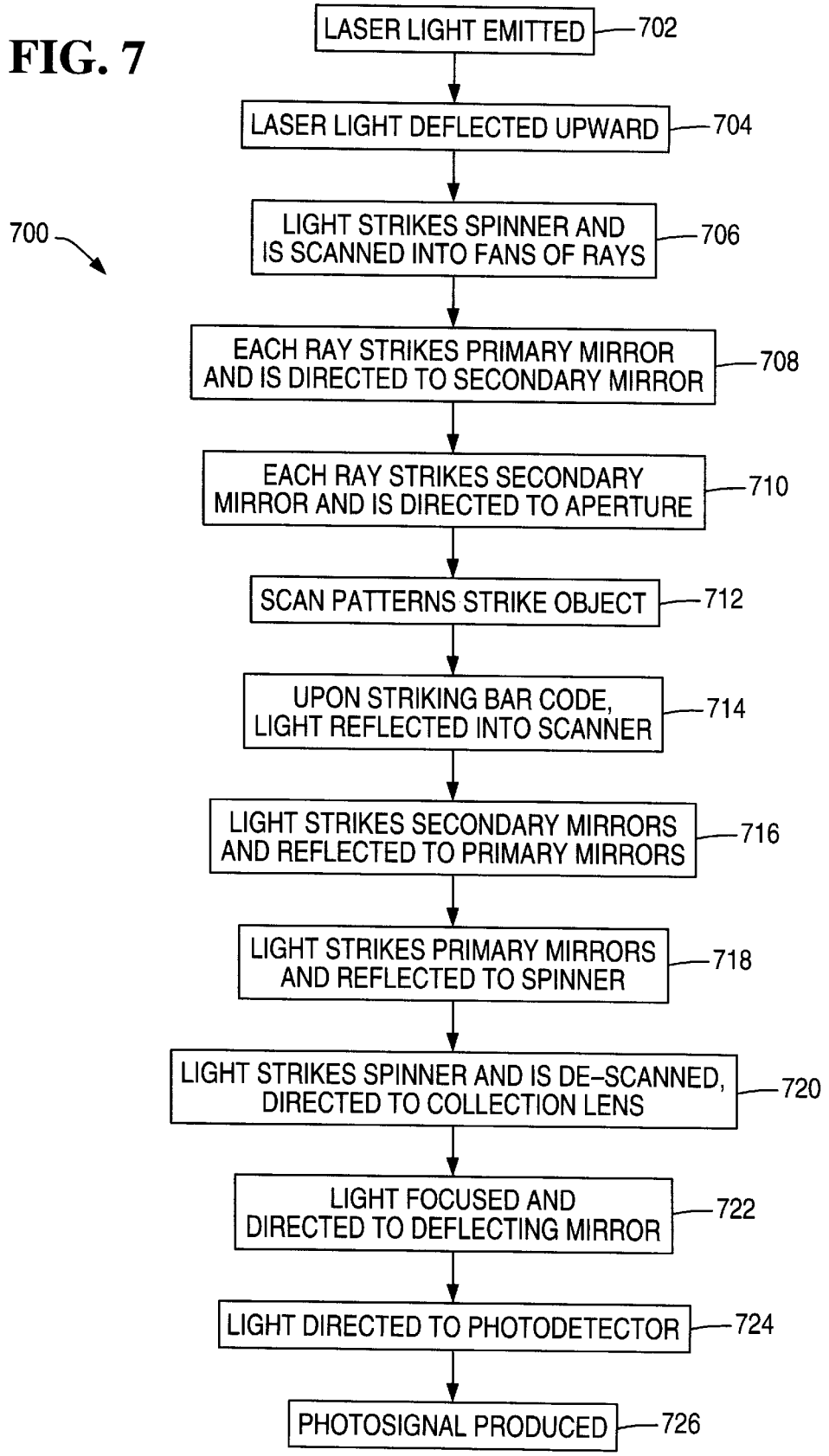
FIG. 7 illustrates a process of scan pattern generation according to the present invention.

FIG. 7 illustrates a process of scan pattern generation and bar code detection 700 according to the present invention. At step 702, laser light is emitted from a laser source located within a scanner. The scanner may suitably be similar to the scanner 100 of FIG. 1A. The laser source may suitably be located in a vertical cabinet section, or tower, of a scanner similar to the tower 102 of FIG. 1A. The tower of the scanner may include a vertical aperture similar to the vertical aperture 108 of FIG. 1A, and the scanner may also include a horizontal cabinet section, or optics base, similar to the optics base of FIG. 1A, having a horizontal aperture similar to the horizontal aperture 104 of FIG. 1A.

At step 704, the laser light is deflected upward into an upper portion of the cabinet, suitably by a deflecting mirror similar to the mirror 302 of FIG. 3. At step 706, the laser light strikes a rotating spinner having multiple reflective facets and is scanned by the spinner into a fan of rays. The spinner may suitably be similar to the spinner 206 and may suitably be rectangular in shape with facets having differing orientation angles, with different facets deflecting rays in different directions. At step 708, each of the rays strikes one of a set of primary mirrors and is directed to one of a set of secondary mirrors. At step 710, each of the rays is directed from a secondary mirror to either the horizontal aperture or the vertical aperture. Due to the placements and orientations of the primary and secondary mirrors, some of the rays follow a path taking them in the direction of the spinner before being directed toward the horizontal or vertical aperture. Each ray is directed to either the horizontal aperture or the vertical aperture depending on which facet of the spinner produced the ray from the original laser beam and which primary and secondary mirrors directed the ray from the spinner to the aperture. All the rays emerging from the horizontal aperture form a scan pattern at the horizontal aperture and all the rays emerging from the vertical aperture form a scan pattern at the vertical aperture. At step 712, scan patterns from the horizontal and vertical apertures strike an object placed before the apertures. At step 714, upon striking a bar code, light reflected and scattered from the bar code enters the scanner through the horizontal or vertical aperture and is directed toward the secondary mirrors. At step 716, the scattered light is reflected from the secondary mirrors to corresponding primary mirrors. At step 718, the scattered light is reflected from the primary mirrors to the spinner. At step 720, the scattered light is de-scanned by the spinner and light is focused by the collection lens. At step 722, the light is focused by the collection lens and directed to the deflection mirror. At step 724, the light is directed by the deflection mirror to a photodetector. At step 726, the photodetector produces a photosignal based on the light.

While the present invention is disclosed in the context of a presently preferred embodiment, it will be recognized that a wide variety of implementations may be employed by persons of ordinary skill in the art consistent with the above discussion and the claims which follow below. By way of example, while a presently preferred rectangular spinner and arrangements of primary and secondary mirrors are described herein, it will be recognized that different spinner configurations and different arrangements of primary and secondary mirrors may be employed to establish different scanning patterns.

I claim:

1. A dual aperture scanner, comprising:

a shallow horizontal cabinet including a horizontal aperture;

a vertical cabinet including a vertical aperture;

a laser source located in a lower portion of the vertical cabinet for producing a laser beam;

a deflecting mirror located adjacent to the laser source for deflecting the laser beam to an upper portion of the vertical cabinet;

a multifaceted spinner within an upper portion of the vertical cabinet in a path of the laser beam as deflected by the deflecting mirror, the spinner being operative to rotate within the path of the laser beam and scan the laser beam to produce a plurality of rays, the spinner being configured so as to direct the rays in desired directions while insuring that the space within the horizontal and vertical cabinets occupied by the paths traveled by the rays is relatively small and to direct the rays in such a way that the rays emerge from the horizontal aperture to create a scan pattern and the paths traveled by the rays occupy a relatively shallow volume fitting within the horizontal cabinet; and a combination of mirrors to receive the rays produced by the spinner and direct the rays to each of the horizontal and vertical apertures to produce a scan pattern emerging from each of the horizontal and vertical apertures, the mirrors being configured to insure that the volume occupied within the horizontal and vertical cabinets by the paths traveled by the rays is relatively small and to direct the rays such that the rays produce a scan pattern emerging from the horizontal aperture and the paths traveled by the rays occupy a relatively shallow volume within the horizontal cabinet.

2. The scanner of claim 1 wherein the series of mirrors comprises a set of primary and secondary mirrors, each of the primary mirrors being placed in a path of one or more of the plurality of rays to deflect the rays toward one of the secondary mirrors, each of the secondary mirrors being placed in a path of one or more of the rays as deflected by a primary mirror in order to direct the ray toward one of the horizontal and the vertical apertures.

3. The scanner of claim 1 wherein the spinner has four facets and is rectangular in shape.

4. The scanner of claim 3 wherein the first and third facets are longer than the second and fourth facets and wherein the first and third facets are angled inward.

5. The scanner of claim 4 wherein the second and fourth facets are angled outward.

6. The scanner of claim 5 wherein the first and third facets produce rays having a direction with a horizontal component and wherein the second and fourth facets produce rays having a direction with a horizontal component opposite the horizontal component of the direction of the rays produced by the first and third facets.

7. The scanner of claim 6 wherein the spinner, primary mirrors and secondary mirrors are oriented such that certain of the rays produced by the spinner are directed to the vicinity of the spinner and in the same plane as the spinner before being directed to an aperture.

8. The scanner of claim 7 and also including a collection lens and a photodetector and wherein the laser source, spinner, motor, deflecting mirror, collection lens and primary mirrors are all mounted in a single mounting block and are located in the vertical section of the scanner.

9. The scanner of claim 8 and also including a collection lens and a photodetector and wherein the secondary mirrors are also arrayed to receive scattered light reflected into the scanner and to deflect the scattered light to the primary mirrors, wherein the primary mirrors are arrayed to receive the scattered light from the secondary mirrors and to deflect the scattered light to the spinner and wherein the spinner is operative to de-scan the scattered light and deflect the scattered light to the collection lens, wherein the collection lens is adapted to receive the scattered light and direct the scattered light to the deflecting mirror, wherein the deflecting mirror is positioned to deflect the scattered light to the photodetector and wherein the photodetector is operative to receive the scattered light and produce a photosignal based on the scattered light.

10. The scanner of claim 4 wherein the deflecting mirror is positioned at an angle of 45 degrees from vertical.

11. The scanner of claim 5 wherein the horizontal cabinet is relatively shallow.

12. A method of dual aperture scan pattern generation comprising the steps of:
   producing a beam of laser light in a lower portion of a vertical cabinet;
   reflecting the light upward to a rotating spinner located in an upper portion of the vertical cabinet;
   deflecting the light from the spinner to produce a plurality of rays traveling within the vertical cabinet and to and within a horizontal cabinet, the rays being directed so as to travel in paths occupying a relatively small volume within the horizontal and vertical cabinets and to direct the rays in such a way that the paths traveled by the rays occupy a relatively shallow volume within the horizontal cabinet; and
   directing each ray of the plurality of rays to one of a vertical aperture in the vertical cabinet and a horizontal aperture in a horizontal cabinet to produce a scan pattern at each of the vertical aperture and the horizontal aperture.

13. The method of claim 12 wherein the step of directing each ray to one of the vertical aperture and the horizontal aperture includes the steps of:
   reflecting each ray of the plurality of rays from the spinner to one of a set of primary mirrors;
   further reflecting each ray of the plurality of rays from the primary mirror to a corresponding secondary mirror; and
   further reflecting each ray of the plurality of rays from the secondary mirror to one of the vertical aperture and the horizontal aperture.

14. The method of claim 13 wherein the step of reflecting each ray of the plurality of rays from the spinner includes reflecting some of the rays in a first direction having a horizontal component and reflecting others of the rays in a second direction having a horizontal component opposite the horizontal component of the first direction.

15. The method of claim 14 where the step of directing each ray of the plurality of rays from the primary mirror to a secondary mirror includes reflecting certain of the rays to the vicinity of the spinner and in the plane of the spinner.

16. The method of claim 15 and also including the steps of:
   receiving reflected light produced by scattering of a scan pattern by a bar code through one of the horizontal and the vertical aperture; and
   directing the reflected light to a photodector to produce a photosignal based on the reflected light.

17. The method of claim 16 wherein the step of directing the reflected light to the photodetector includes the steps of:
   reflecting the light from one or more of the secondary mirrors to corresponding ones of the primary mirrors;
   reflecting the light from the primary mirrors to the spinner;
   de-scanning the light at the spinner;
   collecting and focusing the light; and
   passing the light to the photodetector.

18. A dual aperture scanner, comprising:
   a horizontal cabinet including a horizontal aperture;
   a vertical cabinet including a vertical aperture;
   a laser source located in a lower portion of the vertical cabinet for producing a laser beam;
   a deflecting mirror located adjacent to the laser source for deflecting the laser beam to an upper portion of the vertical cabinet;
   a rectangular spinner having four facets, the first and third facets being longer than the second and fourth facets and the first and third facets being angled inward, the spinner being located within an upper portion of the vertical cabinet in a path of the laser beam as deflected by the deflecting mirror, the spinner being operative to rotate within the path of the laser beam and scan the laser beam to produce a plurality of rays; and
   a series of mirrors to receive the rays produced by the spinner and direct the rays to each of the horizontal and vertical apertures to produce a scan pattern emerging from each of the horizontal and vertical apertures.

19. The scanner of claim 18 wherein the second and fourth facets are angled outward.

20. The scanner of claim 19 wherein the first and third facets produce rays having a direction with a horizontal component and wherein the second and fourth facets produce rays having a direction with a horizontal component opposite the horizontal component of the direction of the rays produced by the first and third facets.

21. The scanner of claim 20 wherein the spinner, primary mirrors and secondary mirrors are oriented such that certain of the rays produced by the spinner are directed to the vicinity of the spinner and in the same plane as the spinner before being directed to an aperture.

22. The scanner of claim 21 and also including a collection lens and a photodetector and wherein the laser source, spinner, motor, deflecting mirror, collection lens and primary mirrors are all mounted in a single mounting block and are located in the vertical section of the scanner.

23. The scanner of claim 22 and also including a collection lens and a photodetector and wherein the secondary mirrors are also arrayed to receive scattered light reflected into the scanner and to deflect the scattered light to the primary mirrors, wherein the primary mirrors are arrayed to receive the scattered light from the secondary mirrors and to deflect the scattered light to the spinner and wherein the spinner is operative to de-scan the scattered light and deflect the scattered light to the collection lens, wherein the collection lens is adapted to receive the scattered light and direct the scattered light to the deflecting mirror, wherein the deflecting mirror is positioned to deflect the scattered light to the photodetector and wherein the photodetector is operative to receive the scattered light and produce a photosignal based on the scattered light.

24. A method of dual aperture scan pattern generation comprising the steps of:

producing a beam of laser light in a lower portion of a vertical cabinet;

reflecting the light upward to a rotating spinner located in an upper portion of the vertical cabinet;

reflecting the light from the spinner to produce a plurality of rays, some of the rays being reflected in a first direction having a horizontal component and others of the rays being reflected in a second direction having a horizontal component opposite the horizontal component of the first direction; and reflecting each ray of the plurality of rays from the spinner to one of a set of primary mirrors;

further reflecting each ray of the plurality of rays from the primary mirror to a corresponding secondary mirror; and further reflecting each ray of the plurality of rays from the secondary mirror to one of a vertical aperture in the vertical cabinet and a horizontal aperture in the horizontal cabinet.

25. The method of claim 24 where the step of directing each ray of the plurality of rays from the primary mirror to a secondary mirror includes reflecting certain of the rays to the vicinity of the spinner and in the plane of the spinner.

26. The method of claim 25 and also including the steps of:

receiving reflected light produced by scattering of a scan pattern by a bar code through one of the horizontal and the vertical aperture; and directing the reflected light to a photodector to produce a photosignal based on the reflected light.

27. The method of claim 26 wherein the step of directing the reflected light to the photodetector includes the steps of:

reflecting the light from one or more of the secondary mirrors to corresponding ones of the primary mirrors;

reflecting the light from the primary mirrors to the spinner, de-canning the light at the spinner;

collecting and focusing the light; and passing the light to the photodetector.

28. A dual aperture scanner, comprising:

a horizontal cabinet including a horizontal aperture;

a vertical cabinet including a vertical aperture;

a laser source located in a lower portion of the vertical cabinet for producing a laser beam;

a deflecting mirror located adjacent to the laser source for deflecting the laser beam to an upper portion of the vertical cabinet;

a multifaceted spinner within an upper portion of the vertical cabinet in a path of the laser beam as deflected by the deflecting mirror, the spinner being operative to rotate within the path of the laser beam and scan the laser beam to produce a plurality of rays; and a series of mirrors to receive the rays produced by the spinner and direct the rays to each of the horizontal and vertical apertures to produce a scan pattern emerging from each of the horizontal and vertical apertures, the mirrors being positioned such that some of the rays travel in paths very near the spinner and in the plane of the spinner in order to use space near the spinner so that the paths traveled by the rays have a desired length while occupying relatively small volumes within the horizontal and vertical cabinets.

* * * * *